(12) United States Patent
Shin et al.

(10) Patent No.: US 12,197,322 B2
(45) Date of Patent: *Jan. 14, 2025

(54) METHOD, MEMORY CONTROLLER AND STORAGE DEVICE TO PERFORM GARBAGE COLLECTION BASED ON FRAGMENTATION RATIO OF BLOCKS

(71) Applicant: SAMSUNG ELECTRONICS CO., LTD., Suwon-si (KR)

(72) Inventors: Dongeun Shin, Seoul (KR); Jonghwa Kim, Suwon-si (KR); Alain Tran, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,936

(22) Filed: Jun. 7, 2023

(65) Prior Publication Data
US 2023/0333979 A1    Oct. 19, 2023

Related U.S. Application Data

(63) Continuation of application No. 17/455,232, filed on Nov. 17, 2021, now Pat. No. 11,698,855.

(30) Foreign Application Priority Data

Dec. 28, 2020    (KR) .................. 10-2020-0185208

(51) Int. Cl.
*G06F 12/02*    (2006.01)

(52) U.S. Cl.
CPC .. *G06F 12/0246* (2013.01); *G06F 2212/7205* (2013.01)

(58) Field of Classification Search
CPC .................. G06F 12/0246; G06F 2212/7205
See application file for complete search history.

(56) References Cited

U.S. PATENT DOCUMENTS

| | | |
|---|---|---|
| 8,799,561 B2 | 8/2014 | Bux et al. |
| 10,241,718 B2 | 3/2019 | Seo et al. |
| 10,282,130 B2 | 5/2019 | Chen et al. |
| 10,353,814 B2 | 7/2019 | Boitei |
| 10,621,084 B2 | 4/2020 | Halumi et al. |

(Continued)

FOREIGN PATENT DOCUMENTS

KR    10-1501717    3/2015

*Primary Examiner* — Chie Yew
(74) *Attorney, Agent, or Firm* — F. CHAU & ASSOCIATES, LLC

(57) ABSTRACT

An operating method of a memory controller configured to control a memory device including memory blocks each for storing a plurality of pages is provided. The operating method includes transferring a program command to the memory device based on a write request from a host, updating a valid page bitmap representing validity of a plurality of pages based on valid page information received from the memory device, calculating a fragmentation ratio representing a segmentation degree between at least one valid page and at least one invalid page of a memory block based on the valid page bitmap, determining source blocks among the memory blocks in ascending order of fragmentation ratios, and performing garbage collection on the source blocks.

20 Claims, 22 Drawing Sheets

(56) References Cited

U.S. PATENT DOCUMENTS

| | | |
|---|---|---|
| 10,678,687 B2 | 6/2020 | Na et al. |
| 2017/0308464 A1 | 10/2017 | Hwang |
| 2019/0286556 A1* | 9/2019 | You .................... G06F 12/0246 |
| 2020/0097401 A1 | 3/2020 | Lee |
| 2020/0097403 A1 | 3/2020 | Saxena et al. |
| 2020/0133845 A1 | 4/2020 | Kim et al. |
| 2021/0224187 A1 | 7/2021 | Um |
| 2022/0206938 A1 | 6/2022 | Shin et al. |

\* cited by examiner

| 1 | 1 | 1 | 1 |
|---|---|---|---|
| 0 | 1 | 0 | 0 |
| 1 | 1 | 0 | 0 |
| 1 | 1 | 1 | 0 |

↓ ↓ ↓ ↓
2 1 2 2

METHOD, MEMORY CONTROLLER AND STORAGE DEVICE TO PERFORM GARBAGE COLLECTION BASED ON FRAGMENTATION RATIO OF BLOCKS

CROSS-REFERENCE TO RELATED APPLICATIONS

This application is a continuation under 35 U.S.C. 120 of U.S. application Ser. No. 17/455,232, filed on Nov. 17, 2021 in the U.S. Patent and Trademark Office, which is based on and claims priority under 35 U.S.C. § 119 to Korean Patent Application No. 10-2020-0185208, filed on Dec. 28, 2020, in the Korean Intellectual Property Office, the disclosures of which are incorporated by reference herein in their entireties.

TECHNICAL FIELD

This disclosure relates generally to an operating method of a storage device, and more particularly to techniques for efficient removal/overwriting of unnecessary data ("garbage collection") during operation of storage devices.

DISCUSSION OF RELATED ART

Storage devices such as solid state drive (SSD), non-volatile memory express (NVMe), embedded multimedia card (eMMC), and universal flash storage (UFS) using a non-volatile memory device, are widely used in today's electronic devices.

As data is continuously written in flash memory via a program, valid data (e.g., data still relevant for the program and is not to be overwritten yet) may be distributed throughout the flash memory in units such as pages. Memory blocks may each store a plurality of pages. Meanwhile, an old page of data that is overwritten with a new page may not necessarily be immediately erased and replaced by the new page in the same memory location. Instead, the new page may be stored in a different memory block.

A free memory block is a storage area completely free (e.g., no data is currently stored) to enable writing of one or more data units such as pages. When a first memory block is in an unfree state with valid and invalid pages already stored, it may be converted into a free memory block by "moving" the valid pages to a second memory block. This may be done by copying the valid pages to the second memory block and then erasing the invalid and valid pages in the first memory block. This process is known as garbage collection.

A current method for garbage collection uses a valid page count for memory blocks selectable to become free memory blocks. If the valid page count (the number of valid pages stored in the memory block) of a candidate memory block is beyond a threshold, it may be selected for conversion to a free memory block. While this method may improve efficiency of garbage collection, a garbage collection method having relatively higher data input/output (I/O) efficiency is needed for I/O data processing at high speeds.

SUMMARY

Embodiments of the inventive concept provide an operating method of a memory controller which efficiently performs garbage collection by determining "fragmentation ratios" each representing a segmentation degree of a candidate memory block based on grouping of valid pages in the candidate memory block; and selecting a source block among the candidate blocks based on the fragmentation ratios. Embodiments include a storage device and an operating method thereof, which efficiently perform garbage collection based on such fragmentation ratios.

According to an aspect of the inventive concept, there is provided an operating method of a memory controller configured to control a memory device including memory blocks, each for storing a plurality of pages, the operating method including transferring a program command to the memory device based on a write request from a host, updating a valid page bitmap representing validity of a plurality of pages of the memory blocks based on valid page information received from the memory device, calculating a fragmentation ratio representing a segmentation degree between at least one valid page and at least one invalid page of a memory block among the memory blocks, based on the valid page bitmap, determining source blocks among the memory blocks in ascending order of fragmentation ratios, and performing garbage collection on the source blocks.

According to another aspect of the inventive concept, there is provided an operating method of a storage device including a memory device that includes memory blocks each for storing a plurality of pages, and a memory controller configured to control the memory device, the operating method includes executing, by the memory controller, operations including: receiving data and a write request from a host, transferring a program command to the memory device. The memory device may write the data in a memory space and generate valid page information representing whether a page corresponding to the memory space with the data written therein is valid. The memory controller may further execute operations of: updating a valid page bitmap representing validity of the plurality of pages based on valid page information received from the memory device, calculating a fragmentation ratio representing a segmentation degree of a valid page and an invalid page based on the valid page bitmap, and performing garbage collection based on the fragmentation ratio.

According to another aspect of the inventive concept, there is provided a storage device including a memory device including a plurality of memory blocks each for storing multiple pages, the memory device being configured to provide valid page information about the plurality of memory blocks, and a memory controller configured to calculate a fragmentation ratio representing a segmentation degree between at least one valid page and at least one invalid page of a memory block based on the valid page information and to rearrange and erase data within the plurality of memory blocks based on the fragmentation ratio in a garbage collection process.

Another aspect of the inventive concept provides an operating method of a memory controller configured to control a memory device including memory blocks, each for storing a plurality of pages. The operating method involves: transferring a program command to the memory device based on a write request from a host; updating a valid page bitmap representing validity of a plurality of pages based on valid page information received from the memory device; and calculating fragmentation ratios (FRs) based on the valid page bitmap. Each FR represents a segmentation degree of a respective memory block among the memory blocks. Each segmentation degree equals a number of valid page groups of the respective memory block. Each valid page group is a group of adjacent valid pages within the memory block in which each of a first page of the valid page group and a last page of the valid page group is not adjacent to a previous valid page, and a succeeding valid page, respectively, of the respective memory block. A source block is determined among the memory blocks as a block having a lower fragmentation ratio than that of other memory blocks. Garbage collection is performed on the source block.

BRIEF DESCRIPTION OF THE DRAWINGS

Embodiments of the inventive concept will be more clearly understood from the following detailed description taken in conjunction with the accompanying drawings in which:

FIG. 12 is a conceptual diagram describing a fragmentation ratio calculated in a memory controller, according to an embodiment;

DETAILED DESCRIPTION OF EMBODIMENTS

Hereinafter, embodiments will be described in detail with reference to the accompanying drawings.

Figure 1:
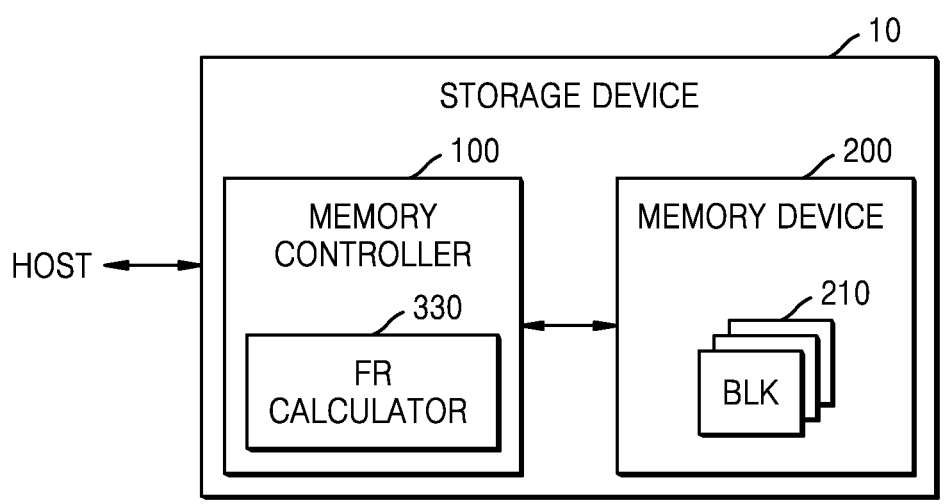
FIG. 1 is a block diagram illustrating a storage device according to an embodiment.

FIG. 1 is a block diagram illustrating a storage device 10 according to an embodiment. The storage device 10 may store data in a storage area. Herein, the term "storage area" may be used to denote an internal logical or physical storage area of the storage device 10 such as a sector, a page, or a block. Thus, phrases such as "storing data in a page" is understood to mean that data in a page unit is stored in a physical storage area.

According to an embodiment, the storage device 10 may calculate a fragmentation ratio on the basis of the validity of pages where data is stored and may perform data realignment on the basis of the fragmentation ratio. Herein, a phrase such as "on the basis of the validity of a data unit" is understood to mean "on the basis of whether the data unit is valid or invalid".

Herein, when a page is relevant to a program, the page is a valid page. For instance, when a program desires to overwrite data by storing new data replacing old data (overwriting the old data), the page containing the new data is a valid page. The page to be overwritten in this process is an invalid page. As mentioned earlier, a method of relocating valid pages and erasing invalid pages may be referred to as garbage collection. A garbage collection process may involve freeing up an entire first block of memory containing both valid and invalid pages. This may be done by copying the valid pages of the first memory block to a second memory block, and then erasing all of the pages within the first memory block. New valid pages may then be stored in the freed-up (first) block of memory.

In an embodiment, the storage device 10 may include a storage system or an embedded memory embedded into a memory system. In an embodiment, the storage device 10 may include embedded multimedia card (eMMC) or an embedded universal flash storage (UFS) memory. In an embodiment, the storage device 10 may include an external memory attachable/detachable on/from the storage system. For example, the storage device 10 may include an UFS memory card, compact flash (CF), secure digital (SD), micro secure digital (Micro-SD), mini secure digital (Mini-SD), extreme digital (xD), or memory stick, but is not limited thereto.

The storage device 10 may include a memory controller 100 and a memory device 200. The memory controller 100 may include a fragmentation ratio (FR) calculator (or an FR calculator) 330, and the memory device 200 may include a plurality of memory blocks BLK 210.

The memory controller 100 may overall control the storage device 10. In response to a read request or a write request from a host, the memory controller 100 may read data stored in the memory device 200 or may control the memory device 200 to program data in the memory device 200. In an embodiment, the memory controller 100 may provide the memory device 200 with an address, a command, and a control signal, and thus, may control a program operation, a read operation, and an erase operation on the memory device 200. Also, data which is based on a request of the host and is to be programmed in the memory device 200 and read data may be transferred and received between the memory controller 100 and the memory device 200.

The FR calculator 330 may calculate an FR on the basis of the validity of a page where data is stored. According to an embodiment, a fragmentation ratio FR may denote a segmentation degree of data. In more detail, the fragmentation ratio FR may represent a segmentation degree of at least one valid page and at least one invalid page of a memory block. According to an embodiment, the fragmentation ratio FR may correspond to the number of direct memory access (DMA) operations performed in a series of processes where data is transferred to a page buffer (not shown) of the memory device 200.

In an embodiment: each FR may represent a segmentation degree of a respective memory block among the memory blocks BLK. Each segmentation degree may equal a number of valid page groups of the respective memory block. Each valid page group may be a group of adjacent valid pages within the memory block, in which each of a first page of the valid page group and a last page of the valid page group is not adjacent to a previous valid page, and a succeeding valid page, respectively, of the respective memory block. For instance, referring momentarily to FIG. 9, some examples of FRs are shown. For a memory block that stores a given number of pages, when there are relatively more groups of valid pages, the FR, and hence the segmentation of the memory block, is relatively higher. This will be explained in detail later. Note that a valid page group can have as little as a single valid page.

According to an embodiment, the fragmentation ratio FR may be calculated based on a valid page bitmap. In an embodiment, the valid page bitmap may represent the validity of each of a plurality of pages. According to an embodiment, validity may be expressed as "0" or "1". For example, a valid page may be expressed as a bit "1" in a valid page bitmap, and an invalid page may be expressed as a bit "0" in the valid page bitmap, or vice versa.

According to an embodiment, the fragmentation ratio FR of a memory block may equal the number of valid page groups of the memory block. (This will be illustrated below with reference to the example of FIG. 9.)

According to an embodiment, the FR calculator 330 may calculate a "fragmentation degree" (FD). Fragmentation degree will be explained further below in connection with the example of FIG. 14. According to an embodiment, the fragmentation degree may correspond to the number of valid page groups and invalid page groups, which are adjacent to one another and have the "same validity condition". Two or more page groups that have the same validity condition are either all valid or all invalid. For example, the FR calculator 330 may detect sequential bits of one memory block in a valid page bitmap, group the sequential bits, and calculate the number of groups having the same validity condition, thereby calculating a fragmentation degree.

The storage device 10 may perform data realignment on the basis of an FR and an FD. In an embodiment, when the FR of candidate memory blocks (for selection of a source memory block) within a set of memory blocks is the same, the storage device 10 may perform data realignment on the basis of the fragmentation degree FD.

A process of calculating an FR by using the FR calculator 330 will be described below in detail with reference to FIGS. 5 and 9.

The memory device 200 may include a non-volatile memory device. In an embodiment, the memory device 200 may include a device to which various kinds of memories, such as NAND-type flash memory, magnetic RAM (MRAM), spin-transfer torque MRAM, conductive bridging RAM (CBRAM), ferroelectric RAM (FeRAM), phase RAM (PRAM), resistive RAM (RRAM), nano tube RAM, polymer RAM (PoRAM), nano floating gate memory (NFGM), holographic memory, molecular electronics memory), and insulator resistance change memory, are applied.

In an embodiment, the memory device 200 may include flash memory, and the flash memory may include a two-dimensional (2D) NAND memory array or a three-dimensional (3D) (or vertical) NAND (VNAND) memory array. The 3D memory array may be a circuit that includes arrays of memory cells including an active area disposed on a silicon substrate and is associated with an operation of each of the memory cells, and may be configured in a monolithic type on at least one physical level of a circuit which is provided on or in the substrate. The term "monolithic type" may signify that layers of levels configuring the array are stacked just on layers of lower levels of the array. In an embodiment, the 3D memory array may include a plurality of vertical NAND strings which are arranged in a vertical direction to allow at least one memory cell to be disposed on another memory cell. The at least one memory cell may include a charge trap layer. U.S. Pat. Nos. 7,679,133, 8,553, 466, 8,654,587 and 8,559,235 and U.S. Patent Application No. 2011/0233648 disclose appropriate elements of a 3D memory cell array which include a plurality of levels and in which word lines and/or bit lines are shared between the plurality of levels.

The memory device 200 may include a plurality of memory blocks BLK 210. Each of the plurality of memory blocks may include at least one page, and each of the at least one page may include a plurality of memory cells connected to a plurality of word lines. In an embodiment, the memory device 200 may include a plurality of planes including a plurality of memory blocks BLK 210, and particularly, may include a plurality of memory dies respectively including a plurality of planes. According to an embodiment, the memory device 200 may perform a write operation or a read operation by page units, and an erase operation may be performed by block units.

According to an embodiment, the memory device 200 may store data on the basis of a request of the memory controller 100 and may provide the memory controller 100 with valid page information representing the validity of a page where data is stored. According to an embodiment, the memory device 200 may check the validity of a page storing data, generate valid page information, and provide the valid page information to the memory controller 100, at every certain period, each time writing of data ends, or on the basis of a request of the memory controller 100.

The memory device 200 may include a single level cell (SLC) which stores 1-bit data and a multi-level cell (MLC) which stores multi-bit data (for example, 2 or more bits). For example, the memory device 200 may include a triple level cell (TLC) for storing 3-bit data or a quadrature level cell (QLC) for storing 4-bit data, or may include a memory cell for storing 5 or more-bit data).

In an embodiment, the host may provide a command to the storage device 10 and may transfer or receive data. In an embodiment, the host may provide a write command and write data to the storage device 10. In an embodiment, the host may transfer a read command to the storage device 10 and may be provided with read data from the storage device 10. Data provided from the host may have various characteristics.

The host may include one or more processor cores, or may be implemented as a system-on chip (SoC). For example, the host may include a general-use process and a dedicated processor. The host may be a processor, or may correspond to an electronic device or system including a processor. In an embodiment, the host may corresponding a central processing unit (CPU), a processor, a microprocessor, or an application processor (AP).

The host and the memory device 200 may transfer and receive (i.e., interfacing) data on the basis of a predetermined protocol. An interface for communication between the memory device 200 and the host may use various interface schemes such as advanced technology attachment (ATA), serial ATA (SATA), small computer small interface (SCSI), serial attached SCSI (SAS), parallel advanced technology attachment (PATA), peripheral component interconnection (PCI), PCI-Express (PCI-E), IEEE 1394, universal serial bus (USB), secure digital (SD) card, multimedia card (MMC), embedded multimedia card (eMMC), compact flash (CF) card interface, enhanced small disk interface (ESDI), integrated drive electronics (IDE), and mobile industry processor interface (MIPI), but the inventive concept is not limited thereto.

The memory controller 100 and the memory device 200 may transfer/receive a command, an address, and data through one or more channels. That a command transferred from the host is to be performed in a certain storage area of a memory device through a certain channel may be defined by a logical address or a logical block address (LBA) transferred from the host.

Figure 2:
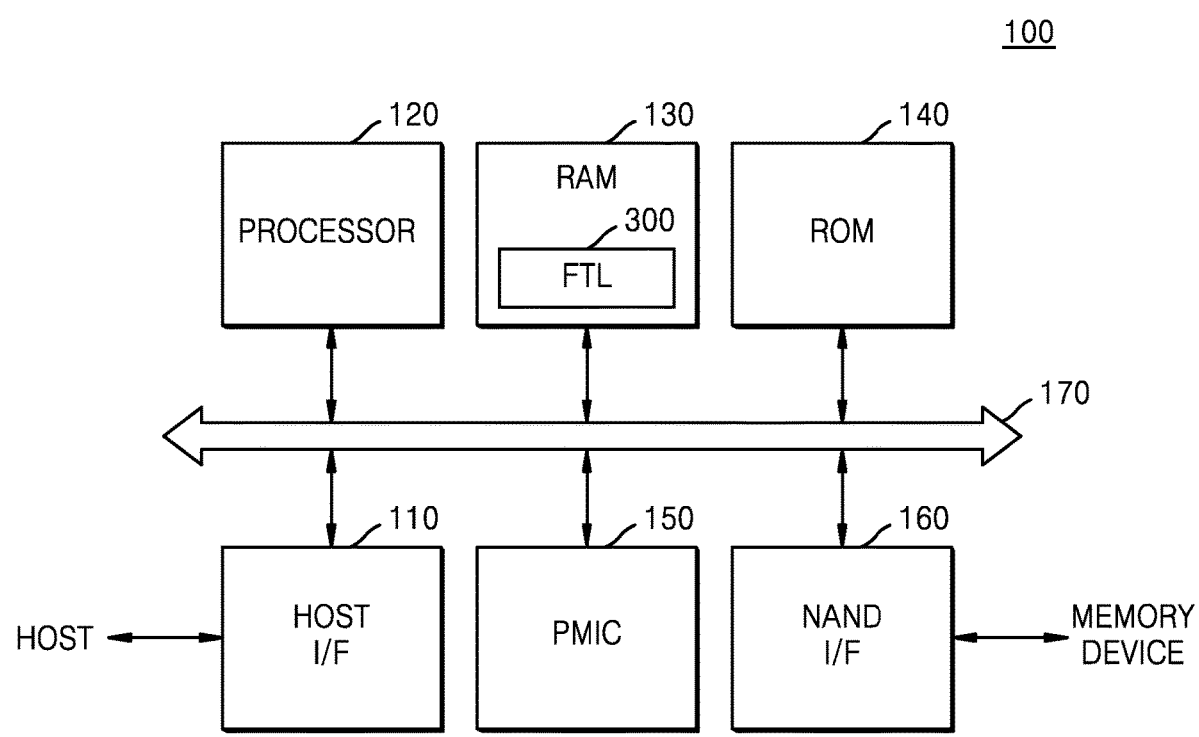
FIG. 2 is a block diagram illustrating a memory controller according to an embodiment.

FIG. 2 is a block diagram illustrating a memory controller 100 according to an embodiment.

FIG. 2 is referred to in conjunction with FIG. 1. The memory controller 100 may receive a request provided from a host and may access a memory device (200 of FIG. 1) in response to the request. In further detail, the memory controller 100 may control a read operation, a program operation, or an erase operation of the memory device 200 in response to the request input from the host. The request may include a read request, a write request, and an erase request. Based on the write request of the host, the memory controller 100 may perform control to directly program data in the memory device 200, or may perform control to perform programming after programmed data is eased.

The memory controller 100 may include a host interface (Host I/F) 110, a processor 120, random access memory (RAM) 130, read only memory (ROM) 140, a power management circuit 150, and a NAND interface (NAND I/F) 160. The host interface 110, the processor 120, the RAM 130, the ROM 140, the power management circuit 150, and the NAND interface 160 may be electrically connected to one another through a bus 170. The bus 170 may denote a transfer path for transferring information between elements of the memory controller 100. The memory controller 100 may further include other elements for a memory operation, in addition to listed elements.

The host interface 110 may include a data exchange protocol between the host and the memory controller 100. Therefore, as the host, various devices may access the host interface 110 In an embodiment, the host interface 110 may provide interfacing with the memory controller 100 on the basis of a bus format of the host. The host interface 110 may include USB, SCSI, PCIe, ATA, PATA, SATA, and SAS as a bus (a bus format) of the host. In an embodiment, the host interface 110 may include a non-volatile memory express (NVMe) protocol installed in a host device which exchanges data on the basis of PICe.

The processor 120 may control overall operations of a storage device (10 of FIG. 1). For instance, the processor 120 may control the storage device 10 to decode the request received from the host and to perform an operation based on a decoded result.

In response to the read request, the processor 120 may provide a read command and an address to a memory device (200 of FIG. 1) in performing the read operation, and in response to the write request, the processor 120 may provide the memory device 200 with a write command, an address, and write data in performing a write operation.

The processor 120 may perform an operation of translating a logical address, received from the host, to a physical page address by using metadata stored in the memory controller 100. Here, the metadata may be understood as management information which is generated by the storage device (10 of FIG. 1) so as to manage the memory device (200 of FIG. 1). The metadata may include mapping table information which is used to translate a logical address to a physical page address of each of flash memories 310 to 330, and moreover, may include pieces of information for managing a storage area of the memory device (200 of FIG. 1).

In more detail, the processor 120 may perform an operation of translating a logical address, received from the host along with a read/write request, to a physical address for a read/write operation of the memory device 200. The operation of translating the logical address to the physical address may be performed in a flash translation layer (FTL) 300. The processor 120 may execute firmware loaded to the ROM 140, and thus, address mapping, wear leveling, or garbage collection for managing the memory device 200 may be performed in the FTL 300.

The RAM 130 may temporarily store data transferred from the host, data generated by the processor 120, and/or data read from the memory device (200 of FIG. 1). Firmware or software for an operation of the storage device may be loaded from the ROM 140 to the RAM 130. Also, the metadata read from the memory device (200 of FIG. 1) may be stored in the RAM 130. The RAM 130 may be implemented as dynamic RAM (DRAM), static RAM (SRAM), or the like.

The RAM 130 may include the flash translation layer 300. The flash translation layer 300 may be an element for mapping each address between a file system and a memory device. In an embodiment, the flash translation layer 300 may translate a logical block address (LB A) of the host to a physical block address (PBA) of the memory device 200. The flash translation layer 300 will be described below in detail with reference to FIG. 5.

The ROM 140 may be a read dedicated memory which stores a program executed by the processor 120. The ROM 140 may store a program for realizing an operating method of the memory controller 100 or firmware with the program recorded therein.

The power management circuit 150 may supply each element of the storage device 10 with power or a clock needed therefor. The NAND interface 160 may be configured to control signals for driving the memory device (200 of FIG. 1) and to access the memory device (200 of FIG. 1) on the basis of control by the processor 120. The NAND interface 160 may be configured to selectively perform software and hardware interleaving operations through at least one channel.

Although not shown, various elements may be further provided for an efficient operation of the storage device 10. For example, the storage device 10 may further include machine learning intellectual property (IP) (not shown). The machine learning IP may include one or more processors for accelerating arithmetic operations performed by models of a neural network, and moreover, may further include a separate memory for storing a program corresponding to the models of the neural network. For example, the processor included in the machine learning IP may correspond to a neural network processing unit (NPU) and may include a fixed function engine for executing a convolution layer and a programmable layer for executing a non-convolution layer. As another example, the processor included in the machine learning IP may be implemented as at least one of a graphical processing unit (GPU) for high-speed parallel processing and a tensor processing unit (TPU) based on application specific integrated circuit (ASIC) for parallel processing performed on a vector or a matrix operation. According to various embodiments, the machine learning IP may be referred to as various terms including a neural network processing device, a neural network integrated circuit, a neuromorphic computing unit), or a deep learning device. Machine learning may use various kinds of network models such as GoogleNet®, AlexNet®, convolution neural network (CNN) such as VGG network, region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzman machine (RBM), fully convolutional network, long short-term memory (LSTM) network, classification network, deep Q-network (DQN), double DQN, dueling DQN, distribution reinforcement learning, multi-step learning, prioritized experience replay (PER), noisy DQN, categorical DQN, rainbow DQN, decentralized policy network (DPN), deep decentralized policy network (DDPN), model-based learning, Monte Carlo, SARSA, Policy Search, Actor-Critic, and A3C, but is not limited thereto.

Figure 3:
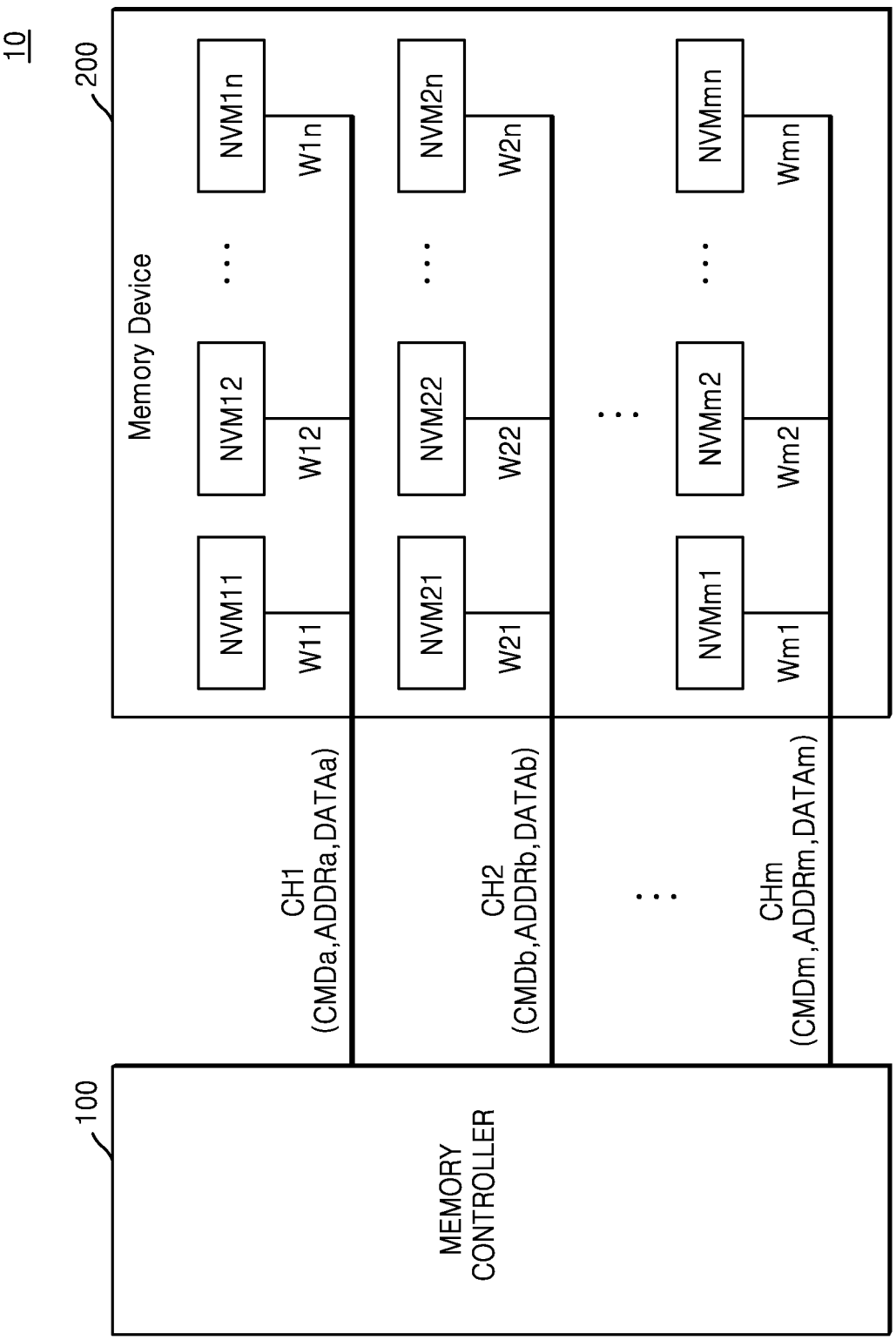
FIG. 3 is a block diagram illustrating a storage device according to an embodiment.

FIG. 3 is a block diagram illustrating a storage device 10 according to an embodiment. The storage device 10 may include a memory controller 100 and a memory device 200. The memory controller 100 and the memory device 200 of FIG. 3 may perform the same functions as those of the memory controller 100 and the memory device 200 of FIG. 1, and thus, repetitive descriptions within a range of the inventive concept are omitted. The storage device 10 may support a plurality of channels CH1 to CHm, and the memory device 200 may be connected to the memory controller 100 through the plurality of channels CH1 to CHm. For example, the storage device 10 may be implemented as a storage device, such as an SSD.

The memory device 200 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be implemented as an arbitrary memory unit that may operate according to an individual command from the memory controller 100. For example, each of the NVM devices NVM11 to NVMmn may be implemented as a chip or a die, but the inventive concept is not limited thereto.

The memory controller 100 may transmit and receive signals to and from the memory device 200 through the plurality of channels CH1 to CHm. For example, the memory controller 100 may transmit commands CMDa to CMDm, addresses ADDRa to ADDRm, and data DATAa to DATAm to the memory device 200 through the channels CH1 to CHm or receive the data DATAa to DATAm from the memory device 200.

The memory controller 100 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 100 may select the NVM device NVM11 from the NVM devices NVM11 to NVM1n connected to the first channel CH1. The memory controller 100 may transmit the command CMDa, the address ADDRa, and the data DATAa to the selected NVM device NVM11 through the first channel CH1 or receive the data DATAa from the selected NVM device NVM11.

The memory controller 100 may transmit and receive signals to and from the memory device 200 in parallel through different channels. For example, the memory controller 100 may transmit a command CMDb to the memory device 200 through the second channel CH2 while transmitting a command CMDa to the memory device 200 through the first channel CHL For example, the memory controller 100 may receive data DATAb from the memory device 200 through the second channel CH2 while receiving data DATAa from the memory device 200 through the first channel CH1.

The memory controller 100 may control all operations of the memory device 200. The memory controller 100 may transmit a signal to the channels CH1 to CHm and control each of the NVM devices NVM11 to NVMmn connected to the channels CH1 to CHm. For instance, the memory controller 100 may transmit the command CMDa and the address ADDRa to the first channel CH1 and control one selected from the NVM devices NVM11 to NVM1n.

Each of the NVM devices NVM11 to NVMmn may operate via the control of the memory controller 100. For example, the NVM device NVM11 may program the data DATAa based on the command CMDa, the address ADDRa, and the data DATAa provided to the first channel CHL For example, the NVM device NVM21 may read the data DATAb based on the command CMDb and the address ADDb provided to the second channel CH2 and transmit the read data DATAb to the memory controller 100.

Although FIG. 3 illustrates an example in which the memory device 200 communicates with the memory controller 100 through m channels and includes n NVM devices corresponding to each of the channels, the number of channels and the number of NVM devices connected to one channel may be variously changed.

Figure 4:
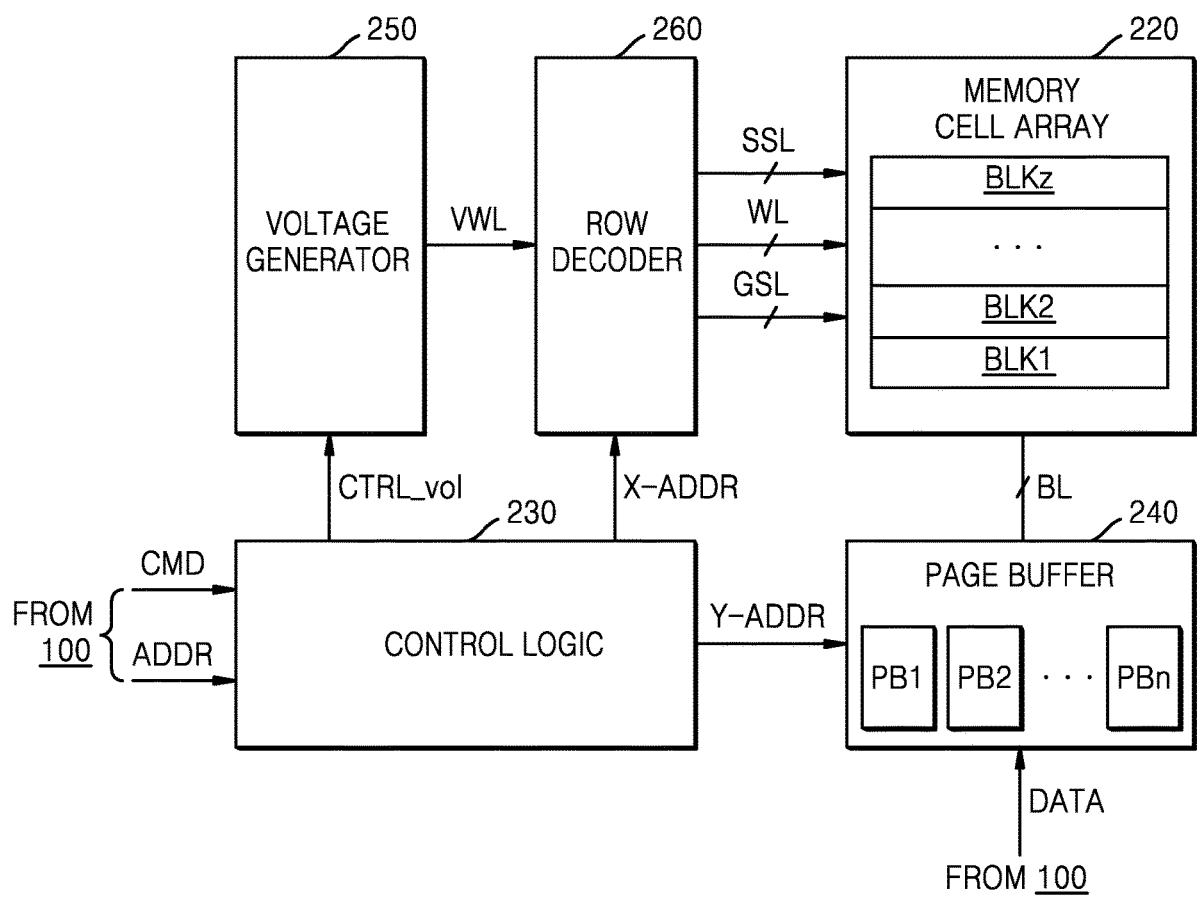
FIG. 4 is a block diagram illustrating a memory device according to an embodiment.

FIG. 4 is a block diagram illustrating a memory device 200 according to an embodiment.

Referring to FIG. 4 with reference to FIG. 2, the memory device 200 may include a control logic 230, a memory cell array 220, a page buffer 240, a voltage generator 250, and a row decoder 260. Although not shown in FIG. 4, the memory device 200 may further include a memory interface circuitry shown in FIG. 4. In addition, the memory device 200 may further include a column logic, a pre-decoder, a temperature sensor, a command decoder, and/or an address decoder.

The control logic 230 may control all various operations of the memory device 200. The control logic 230 may output various control signals in response to commands CMD and/or addresses ADDR from the memory interface circuitry. For example, the control logic 230 may output a voltage control signal CTRL_vol, a row address X-ADDR, and a column address Y-ADDR.

The memory cell array 220 may include a plurality of memory blocks BLK1 to BLKz (here, z is a positive integer), each of which may include a plurality of memory cells. The memory cell array 220 may be connected to the page buffer 240 through bit lines BL and be connected to the row decoder 260 through word lines WL, string selection lines SSL, and ground selection lines GSL.

In an example embodiment, the memory cell array 220 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are incorporated herein by reference. In an example embodiment, the memory cell array 220 may include a 2D memory cell array, which includes a plurality of NAND strings arranged in a row direction and a column direction.

The page buffer 240 may include a plurality of page buffers PB1 to PBn (here, n is an integer greater than or equal to 3), which may be respectively connected to the memory cells through a plurality of bit lines BL. The page buffer 240 may select at least one of the bit lines BL in response to the column address Y-ADDR. The page buffer 240 may operate as a write driver or a sense amplifier according to an operation mode. For example, during a program operation, the page buffer 240 may apply a bit line voltage corresponding to data to be programmed, to the selected bit line. During a read operation, the page buffer 240 may sense current or a voltage of the selected bit line BL and sense data stored in the memory cell.

The voltage generator 250 may generate various kinds of voltages for program, read, and erase operations based on the voltage control signal CTRL_vol. For example, the voltage generator 250 may generate a program voltage, a read voltage, a program verification voltage, and an erase voltage as a word line voltage VWL.

The row decoder 260 may select one of a plurality of word lines WL and select one of a plurality of string selection lines SSL in response to the row address X-ADDR. For example, the row decoder 260 may apply the program voltage and the program verification voltage to the selected word line WL during a program operation and apply the read voltage to the selected word line WL during a read operation.

Figure 5:
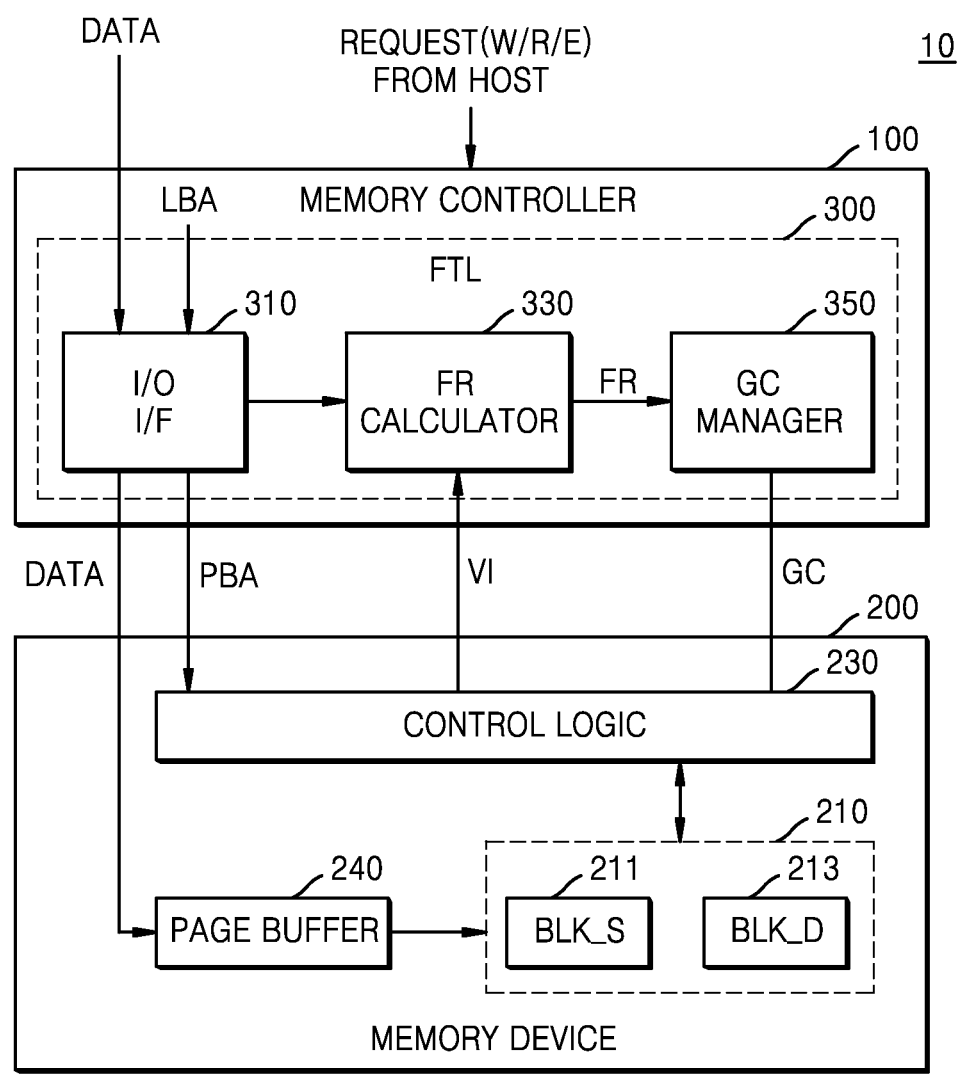
FIG. 5 is a block diagram illustrating a storage device according to an embodiment.

FIG. 5 is a block diagram illustrating a storage device 10 according to an embodiment. The storage device 10 of FIG. 5 may perform the same function as that of the storage device 10 of FIGS. 1 and 2, and thus, repetitive descriptions within a range of the inventive concept are omitted. Hereinafter, an example where the memory device 200 is a flash memory device (i.e., a non-volatile memory (NVM)) will be described. The memory controller 100 may include a flash translation layer 300 as described above.

In an embodiment, the flash translation layer 300 may provide interfacing for concealing an erase operation of the memory device 200 between a file system of a host and a memory device 200. By using the flash translation layer 300, a problem of the memory device 200 where erase-before-write and a mismatch between an erase unit and a write unit and a problem where there a maximum erase count of flash memory may be solved. By executing at least a portion of the flash translation layer 300 by using a processor (120 of FIG. 2), the following operation may be performed by the flash translation layer 300.

In the flash translation layer 300, mapping for allocating a logical address LBA, generated by a file system, as a physical address PBA of the memory device 200 may be performed. The flash translation layer 300 may count a write count per block of the memory device 200 and may perform wear leveling for performing distribution so that a write degree between a plurality of blocks is uniform. Also, the flash translation layer 300 may perform garbage collection of realigning data so as to solve an increase in an invalid area (i.e., garbage) caused by the writing or deleting of data which is repeated in a storage area.

According to an embodiment, the memory controller 100 may calculate a fragmentation ratio FR on the basis of page information which corresponds to a storage area and is written in the memory device 200 and may perform garbage collection on the memory device 200 on the basis of the fragmentation ratio FR, thereby translating an invalid area of the storage area to a valid area.

The flash translation layer 300 may include an input/output (I/O) interface (I/O I/F) 310, an FR calculator 330, and a garbage collection (GC) manager 350.

The I/O interface 310 may receive data DATA (hereafter, just "DATA") which is to be written and the logical address LBA of the DATA in response to a write request of a host and may provide the memory device 200 with the physical address PBA corresponding to the logical address LBA on the basis of a mapping table stored in RAM (130 of FIG. 2) or ROM (140 of FIG. 2). According to an embodiment, the I/O interface 310 may provide the physical address PBA to a control logic 230 and may provide the DATA to a page buffer 240.

The memory device 200 may perform a write operation of writing the DATA in a storage area of the memory device 200 (for example, a plurality of non-volatile memories NVM1 to NVMn (where n is a natural number of 2 or more) on the basis of the physical address PBA received from the I/O interface 310.

According to an embodiment, the control logic 230 may receive the physical address PBA and may output a row address (X-ADDR of FIG. 4) and a column address (Y-ADDR of FIG. 4) of a memory cell array (220 of FIG. 4) so that the DATA is written in a storage area corresponding to the physical address PBA.

According to an embodiment, DATA may be written in the memory cell array 220. A transfer bandwidth of data capable of being transferred at a time may be limited, and thus, DATA may be buffered in the page buffer 240 and then may be sequentially stored in a certain storage area (for example, a page) among a plurality of memory blocks 210 in response to a signal of the column address Y-ADDR output from the control logic 230.

According to an embodiment, as DATA is written in a storage area, the validity of a page included in each of the plurality of memory blocks 210 of the memory device 200 may vary before DATA is written therein. As data is repetitively written in a page and a block including a page is erased, some pages of the memory device 200 may be changed to invalid pages incapable of storing data. According to an embodiment, the control logic 230 may provide the flash translation layer 300 with valid page information VI which is information about the validity of pages included in the plurality of memory blocks 210.

The FR calculator 330 may receive the valid page information VI and may calculate the fragmentation ratio FR on the basis of the valid page information VI. According to an embodiment, the fragmentation ratio FR may denote a segmentation degree of a valid page and an invalid page. According to an embodiment, the FR calculator 330 may classify (group) a plurality of pages configuring one memory block on the basis of validity and may calculate the fragmentation ratio FR corresponding to the number of valid page groups among the valid page groups and invalid page groups.

According to an embodiment, the FR calculator 330 may calculate the fragmentation ratio FR on the basis of a valid page bitmap. In an embodiment, the valid page bitmap may be a bitmap representing the validity of each of a plurality of pages.

The valid page bitmap may have, as a column size, the number of memory blocks included in the memory device 200 and may have, as a row size, the number of pages included in one memory block BLK, but is not limited thereto.

As noted earlier, the validity of each of a plurality of pages included in one memory block may be expressed as a bit "0" or a bit "1". For example, a valid page may be expressed as a bit "1" in a valid page bitmap, and an invalid page may be expressed as a bit "0" in the valid page bitmap, or vice versa.

Figure 14:
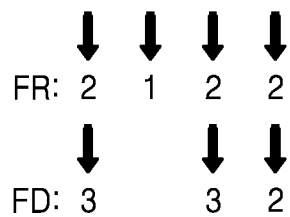
FIG. 14 is a conceptual diagram describing a fragmentation degree calculated in a memory controller, according to an embodiment.

According to an embodiment, the FR calculator 330 may calculate a fragmentation degree. According to an embodiment, the fragmentation degree may correspond to the number of valid page groups and invalid page groups, which are adjacent to one another and have the same validity condition. For example, the FR calculator 330 may detect sequential bits of one memory block in a valid page bitmap, group the sequential bits, and calculate the number of groups having the same validity condition, thereby calculating a fragmentation degree FD (as illustrated in FIG. 14). The FR calculator 330 may provide the GC manager 350 with the fragmentation ratio FR or the fragmentation ratio FR and a fragmentation degree FD.

The GC manager 350 may copy data, stored in a valid page of a source block BLK_S 211 for garbage collection among the plurality of memory blocks 210, to a free page of a destination block BLK_D 213 and may erase the source block BLK_S 211.

As data is continuously written in or erased from the memory device 200, a partial region of a storage area may be invalidated. To secure a free memory block corresponding to a valid area which is a storage area enabling writing of data, it is desirable that a valid page of at least one memory block "moves" to another memory block (by copying the data to the other memory block) and garbage collection GC of performing an erase operation on a corresponding memory block is performed. According to an embodiment, the GC manager 350 may perform garbage collection GC on the basis of the fragmentation ratio FR to more efficiently select the source block 211.

Garbage collection based on a valid page count VPC may be used, but may not be an optimal method of selecting the source block BLK_S 211. According to an embodiment, the GC manager 350 may be provided with the fragmentation ratio FR based on the page validity information VI which is validity information about a page corresponding to a storage area storing DATA, select a block having a lowest fragmentation ratio FR as the source block BLK_S 211, and perform garbage collection GC in ascending order of fragmentation ratios FR. Therefore, the storage device 10 according to an embodiment may perform garbage collection GC on an optimized source block BLK_S 211, thereby maximizing I/O efficiency. Also, the storage device 10 according to an embodiment may perform garbage collection sequentially from a memory block having a low fragmentation ratio, and thus, may ensure the sequential reading of the storage device 10 and may enhance I/O efficiency on the basis of sequential read. Furthermore, the storage device 10 according to an embodiment may decrease the number of times garbage collection is performed. According to an embodiment, garbage collection performance may be improved, and thus, a write amplification factor (WAF) may be reduced. Therefore, the lifetime or performance of the storage device 10 including the memory device 200 may be improved. Also, the performance of a write operation of the storage device 10 may be enhanced, and the lifetime of the storage device 10 may be lengthened. In an embodiment, the WAF may be calculated based on a ratio of data, requested by the host, to data actually written in the memory device 200.

In an embodiment, it may be considered that a method for enhancing the I/O efficiency of the storage device 10 is achieved by performing garbage collection based on a fragmentation ratio FR, but the inventive concept is not limited thereto. According to an embodiment, the I/O efficiency of the storage device 10 may be based on dependency between a plurality of commands transferred to the memory device 200 by the memory controller 100, a state of the host, a request history of the host, and a command issuing history of the memory controller 100. The storage device 10 may perform garbage collection on the basis of dependency between the plurality of commands, the state of the host, the request history of the host, and the command issuing history of the memory controller 100, thereby increasing I/O efficiency.

Figure 6:
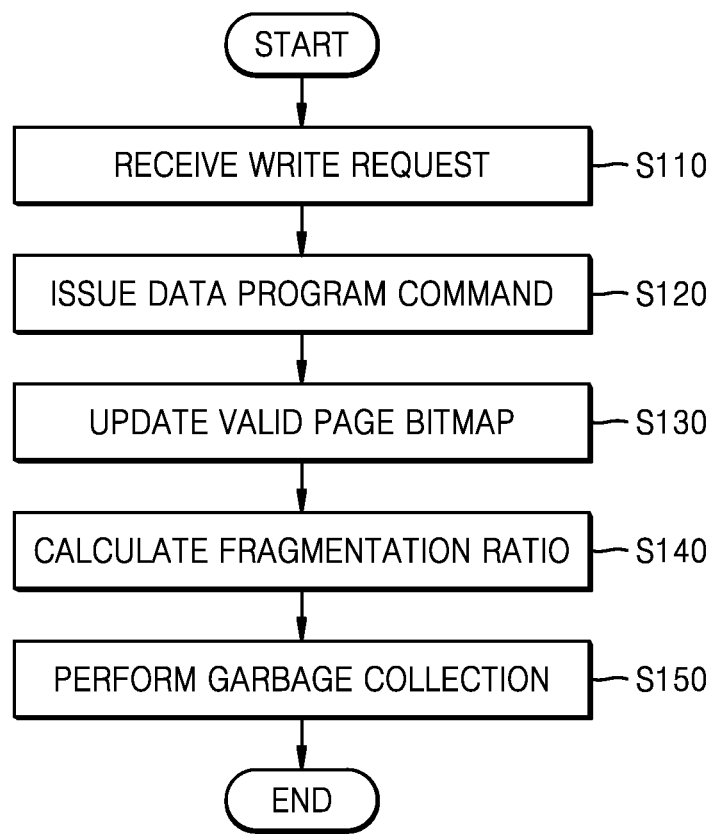
FIG. 6 is a flowchart describing an operating method of a memory controller, according to an embodiment.

FIG. 6 is a flowchart describing an operating method of a memory controller, according to an embodiment. FIG. 6 is referred to in conjunction with FIG. 5.

In operation S110, the memory controller 100 may receive a data write request from a host. The host may provide the memory controller 100 with DATA and a logical address LBA of DATA. According to an embodiment, the I/O interface (310 of FIG. 5) of the memory controller 100 may process an operation corresponding to the write request. For example, the I/O interface 310 may translate the logical address LBA to a physical address PBA and may provide the physical address PBA to the memory device 200.

In operation S120, the memory controller 100 may issue a command to program the data DATA in the memory device 200. According to an embodiment, the memory controller 100 may issue a write command and may provide the write command to the memory device 200, thereby commanding the memory device 200 to perform a write operation. The control logic (230 of FIG. 5) of the memory device 200 may be provided with the physical address PBA, and the page buffer (250 of FIG. 5) may buffer DATA. Buffered data may be sequentially written in a valid page among a plurality of memory blocks (210 of FIG. 5).

In operation S130, the memory controller 100 may update a valid page bitmap. According to an embodiment, the control logic 230 may provide the memory controller 100 with page validity information VI which is information about the validity of a page where DATA is written, and the memory controller 100 may update the valid page bitmap on the basis of the page validity information VI. The valid page bitmap may be a bitmap representing the validity of each of a plurality of pages, and validity may be expressed as a bit "0" or "1".

In operation S140, the memory controller 100 may calculate a fragmentation ratio FR. According to an embodiment, the fragmentation ratio FR may classify (group) a plurality of pages configuring one memory block on the basis of page validity and may correspond to the number of valid page groups among the valid page groups and invalid page groups. (See, e.g., the examples of FR shown in FIG. 9.) According to an embodiment, the fragmentation ratio FR may correspond to the number of direct memory access (DMA) performed in a series of processes where data is transferred to a page buffer (not shown) of the memory device 200.

In operation S150, the memory controller 100 may perform garbage collection GC on the basis of the fragmentation ratio FR. According to an embodiment, the memory controller 100 may select a source block BLK_S sequentially from a memory block having a low fragmentation ratio FR, and thus, sequential read may be ensured, whereby the I/O efficiency of the storage device 10 including the memory controller 100 may be enhanced.

Figure 7:
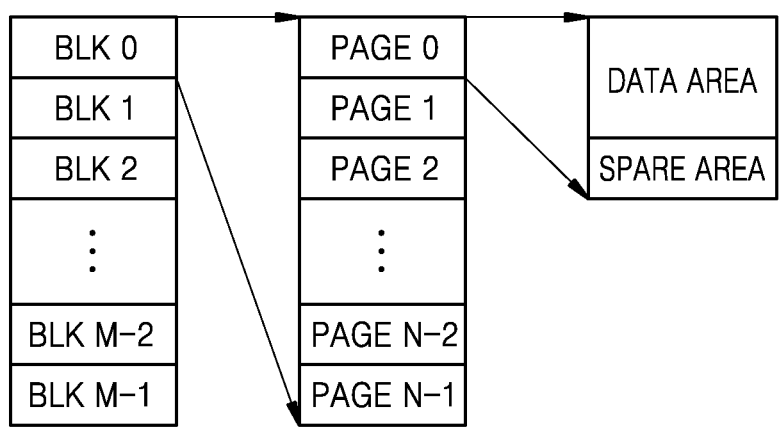
FIG. 7 is a conceptual diagram illustrating a structure of data stored in a memory device, according to an embodiment.

FIG. 7 is a conceptual diagram illustrating a structure of data stored in a memory device, according to an embodiment. FIG. 7 is referred to in conjunction with FIG. 5.

A memory device (200 of FIG. 5) may include a plurality of memory blocks BLK 210. Each of the plurality of memory blocks BLK 210 may include at least one page, and each page may include a plurality of memory cells connected to a plurality of word lines. Each of the memory cells may include at least one transistor, and the transistor may trap an electron to store data.

The memory device 200 may include at least one memory block BLK. For example, the memory device 200 may include M (where M is a natural number of memory blocks (first to $M^{th}$ memory blocks) BLK 0 to BLK M−1. In a storage device (10 of FIG. 5), a read operation and a write operation may be performed by page (or sector) units, and an erase operation may be performed by block units.

One memory block BLK may include N number of pages (first to $N^{th}$ pages) Page0 to Page N−1. DATA written in the storage device (10 of FIG. 5) may be stored in a valid or free page which is in one of one or more blocks BLK of the memory device 200.

One page may be divided into a data area, where data is stored, and a spare area where data is not stored. In an embodiment, 2 KB (kilo-byte) may be allocated to the data area and 64 B (byte) may be allocated to the spare area, but the inventive concept is not limited thereto.

Figure 8:
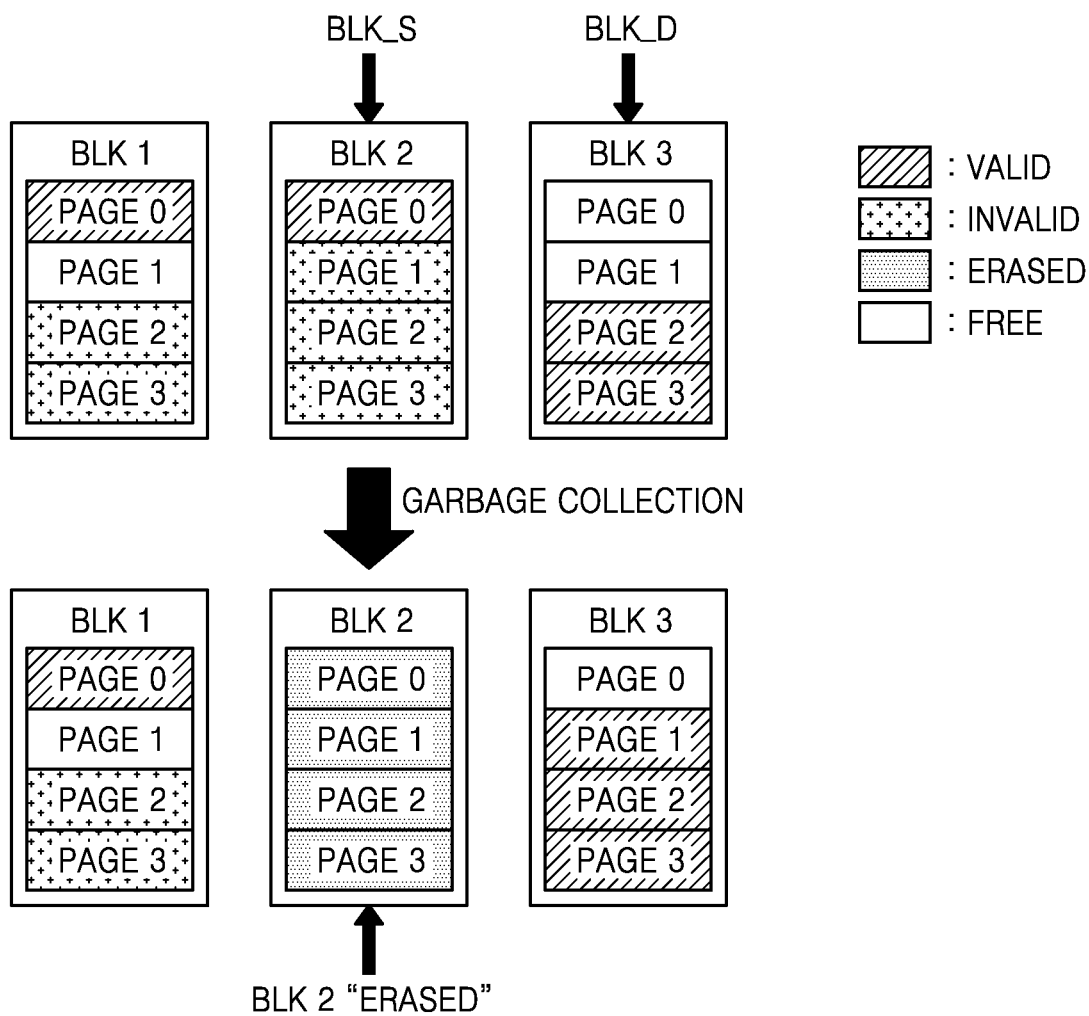
FIG. 8 is a conceptual diagram describing garbage collection performed in a memory device, according to an embodiment.

FIG. 8 is a conceptual diagram describing garbage collection performed in a memory device 200, according to an embodiment.

For convenience of description, it may be assumed that four pages Page0 to Page3 are in each of first to third memory blocks BLK1 to BLK3 of a storage area of a memory device (200 of FIG. 5). The first to third memory blocks BLK1 to BLK3 of FIG. 8 may be some of the first to Mth memory blocks BLK0 to BLK(M−1) of FIG. 7.

The first page Page0 of the first memory block BLK1 may be a valid area where data is capable of being validly written, the second page Page1 thereof may be a free area, and the third page Page2 and the fourth page Page3 thereof may each be an invalid area based on the repetitive writing/erasing of data.

Likewise, the first page Page0 of the second memory block BLK2 may be a valid area, the second page Page1 and the fourth page Page3 thereof may each be an invalid area, and the third page Page2 thereof may be a free area. The first page Page0 and the second page Page1 of the third memory block BLK3 may be a free area, and the third page Page2 and the fourth page Page3 thereof may each be a valid area.

In response to a signal indicating garbage collection GC, garbage collection may be performed in the memory device (200 of FIG. 5), and data stored in the memory block BLK may be realigned. According to an embodiment, the second memory block BLK2 where a number of invalid areas are provided may be determined as a source block BLK_S, and the third memory block BLK3 where a number of free areas are provided may be determined as a destination block BLK_D.

According to an embodiment, data stored in the first page Page0 of the second memory block BLK2 may be copied to the second page Page1 of the third memory block BLK3, and as a result thereof, pieces of data stored in the second memory block BLK2 may not be significant. Therefore, a storage device (10 of FIG. 5) may erase the second memory block BLK2, and thus, all of the second memory block BLK2 may be put in a writable state again. In other words, garbage collection may be performed.

Figure 9:
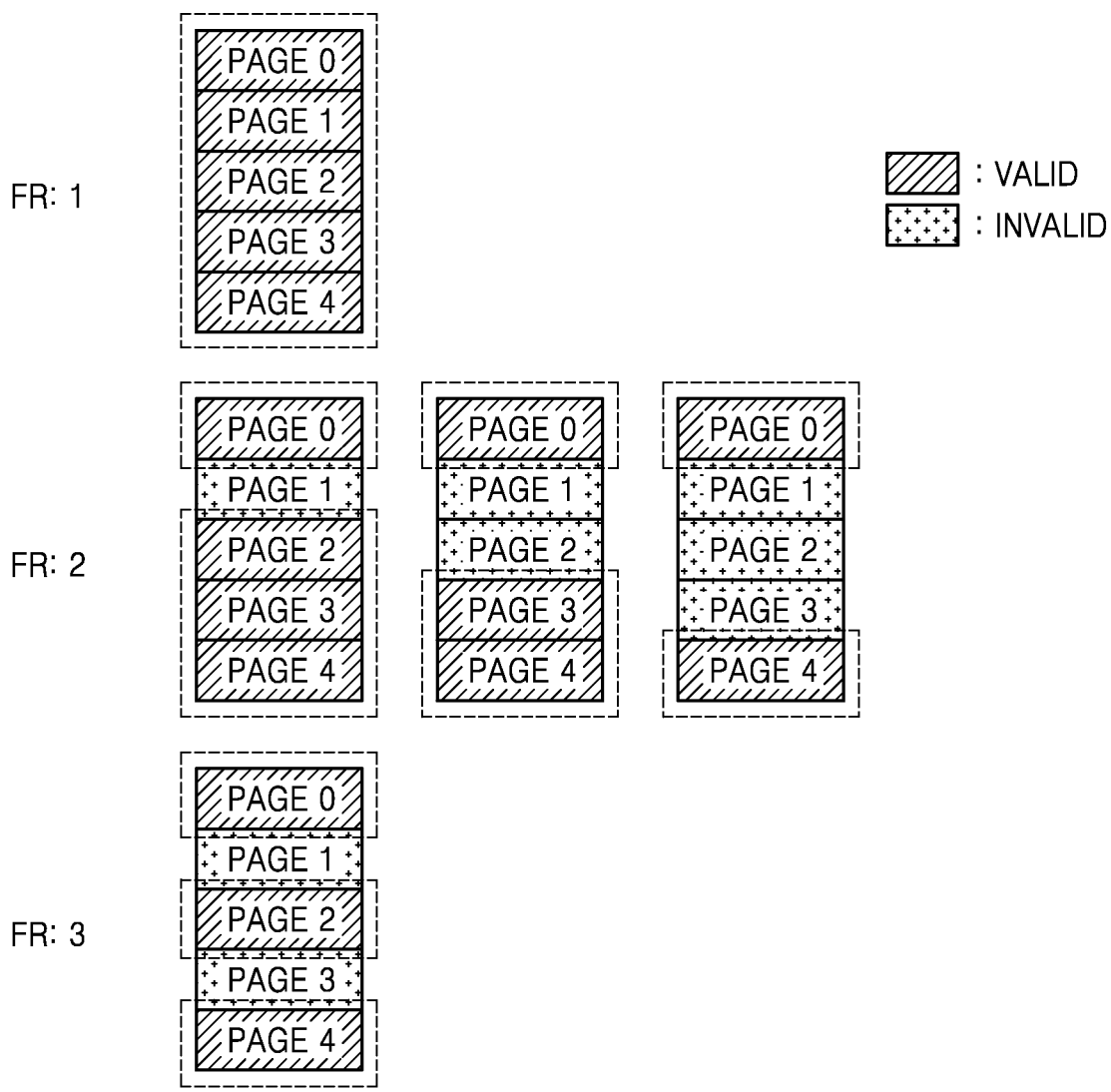
FIG. 9 is a conceptual diagram describing a fragmentation ratio calculated in a memory controller, according to an embodiment.

FIG. 9 is a conceptual diagram describing a fragmentation ratio calculated in a memory device, according to an embodiment. FIG. 9 is referred to in conjunction with FIG. 5.

In FIG. 9, it may be assumed that five pages PAGE0 to PAGE4 are in one memory block. However, the inventive concept is not limited to the number of pages described.

A fragmentation ratio FR, as described above, may classify (group) a plurality of pages configuring one memory block on the basis of validity and may correspond to the number of valid page groups among valid page groups and invalid page groups.

In a case where all of the five pages (for example, first to fifth pages) PAGE0 to PAGE4 configuring one memory block are valid, the first to fifth pages PAGE0 to PAGE4 which are adjacent to one another and have the same validity condition may be grouped into one valid page group. In this case, the number of valid page groups may be one, and thus, the fragmentation ratio FR may be 1.

When at least one of the five pages PAGE0 to PAGE4 configuring one memory block is invalid, two or more valid page groups may be generated. Because sequential read should be ensured, the occurrence of an invalid page may cause an increase in the fragmentation ratio FR.

According to an embodiment, when the first page PAGE0 and the third to fifth pages PAGE2 to PAGE4 are valid but the second page PAGE1 is invalid, the number of valid page groups may be 2. That is, the fragmentation ratio FR may be 2.

Similarly, when the first page PAGE0, the fourth page PAGE3, and the fifth page PAGE4 are valid but the second page PAGE1 and the third page PAGE2 are invalid, the number of valid page groups may be 2 and the fragmentation ratio FR may be 2. Similarly, when the first page PAGE0 and the fifth page PAGE4 are valid but the second to fourth pages PAGE1 to PAGE2 are invalid, the number of valid page groups may be 2 and the fragmentation ratio FR may be 2.

According to an embodiment, when the first page PAGE0, the third page PAGE2, and the fifth page PAGE4 are valid but the second page PAGE1 and the fourth page PAGE3 are invalid, the number of valid page groups may be 3. That is, the fragmentation ratio FR may be 3.

According to an embodiment, the fragmentation ratio FR of a memory may correspond to the number of valid page groups of that memory block.

Figure 10:
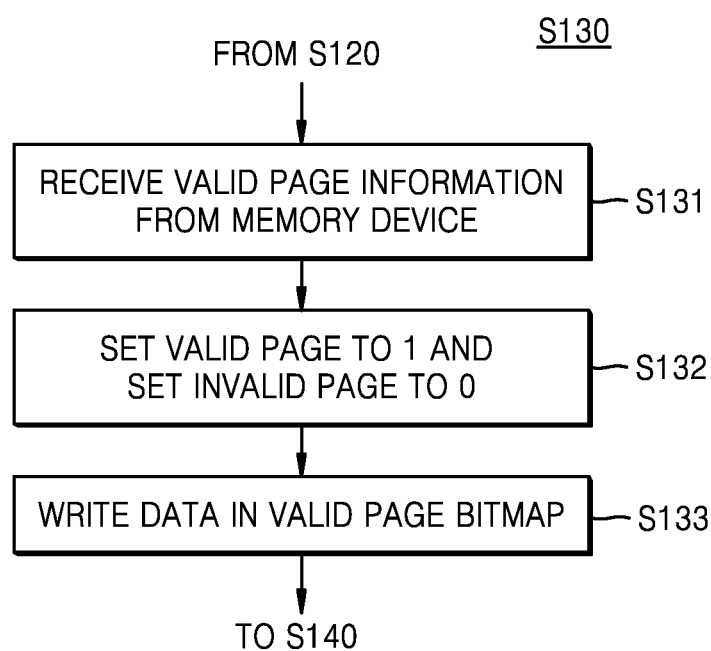
FIG. 10 is a flowchart describing an operating method of a memory controller, according to an embodiment.

FIG. 10 is a flowchart describing an operating method of a memory controller 100, according to an embodiment. FIG. 10 is a flowchart describing operation S130 of FIG. 6 in more detail. FIG. 10 is referred to in conjunction with FIG. 5.

In operation S131 after operation S121 is performed, the memory controller 100 may receive valid page information VI from the memory device 200. The valid page information VI may be information about the validity of pages included in the plurality of memory blocks 210.

In operation S132, the memory controller 100 may set a valid page to a bit "1" and an invalid page, which is not valid, to a bit "0" on the basis of the valid page information VI. According to an embodiment, the valid page information VI may represent the validity of a page, and the memory controller 100 may use a bitmap for schematically representing the validity of a page.

In operation S133, the memory controller 100 may update a valid page bitmap on the basis of the valid page information VI. According to an embodiment, the memory controller 100 may write a bitmap, corresponding to the valid page information VI, in the valid page bitmap. According to an embodiment, a bit may be updated at a position of a bitmap corresponding to a storage area where data is written. For example, a bit representing the validity of a page may be updated at a certain position of a bitmap corresponding to a page and a memory block where DATA is written.

Subsequently, operation S140 may be performed.

Figure 11:
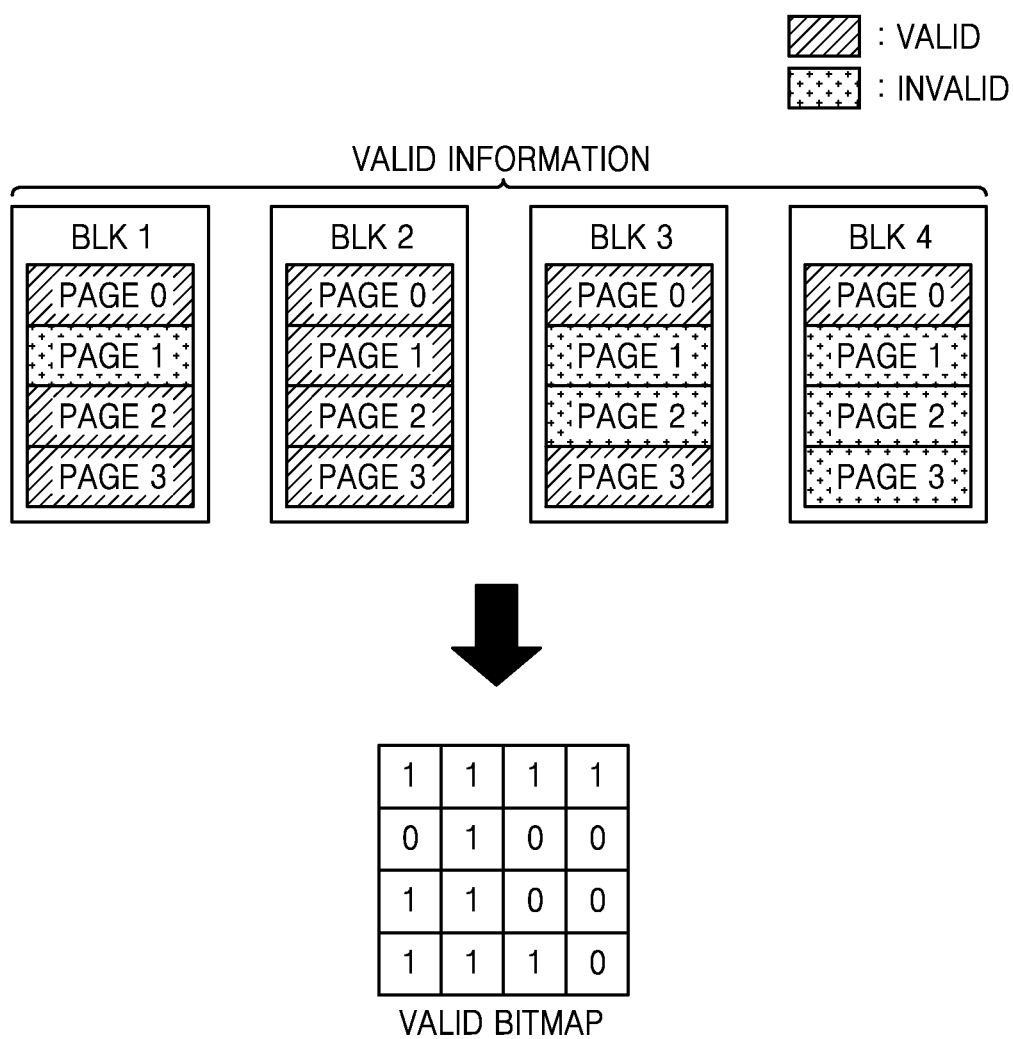
FIG. 11 is a conceptual diagram describing a valid page bitmap according to an embodiment.

FIG. 11 is a conceptual diagram describing a valid page bitmap according to an embodiment. FIG. 11 is referred to in conjunction with FIG. 10.

Referring to FIG. 11, first to fourth memory blocks BLK1 to BLK4 may each include four pages (for example, first to fourth pages) PAGE0 to PAGE3.

According to an embodiment, the first page PAGE0, the third page PAGE2, and the fourth page PAGE3 of the first memory block BLK1 may be valid, but the second page PAGE1 thereof may be invalid. According to an embodiment, all of the first to fourth pages PAGE0 to PAGE3 of the second memory block BLK2 may be valid. According to an embodiment, the first page PAGE0 and the fourth page PAGE3 of the third memory block BLK3 may be valid, but the second page PAGE1 and the third page PAGE2 thereof may be invalid. According to an embodiment, the first page PAGE0 of the fourth memory block BLK4 may be valid, but the second to fourth pages PAGE1 to PAGE3 thereof may be invalid.

According to an embodiment, one memory block may correspond to a column of a valid page bitmap. According to an embodiment, a valid page may be allocated as a bit "1", and an invalid page may be allocated as a bit "0", or vice versa.

According to an embodiment, a first column of a valid page bitmap corresponding to the first memory block BLK1 may include bits "1, 0, 1, and 1", a second column of a valid page bitmap corresponding to the second memory block BLK2 may include bits "1, 1, 1, and 1", a third column of a valid page bitmap corresponding to the third memory block BLK3 may include bits "1, 0, 0, and 1", and a fourth column of a valid page bitmap corresponding to the fourth memory block BLK4 may include bits "1, 0, 0, and 1".

Figure 12:
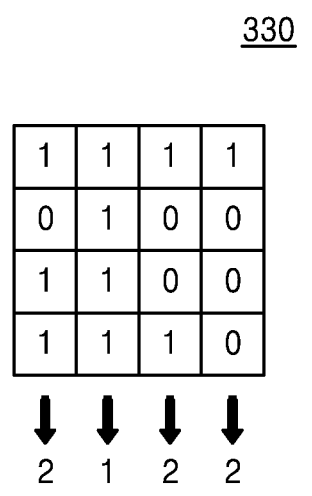

FIG. 12 is a conceptual diagram describing a fragmentation ratio calculated in a memory controller 100, according to an embodiment. FIG. 12 is referred to in conjunction with FIGS. 5 and 11.

The FR calculator 330 may detect sequential bits of one memory block in a valid page bitmap and may group the sequential bits. A valid page bitmap determined or updated in FIG. 12 may be used to calculate a fragmentation ratio FR by using the FR calculator 330.

When read is performed sequentially from an uppermost row of the valid page bitmap, a first column of the valid page bitmap may include bits "1, 0, 1, and 1". Here, the number of sequential bits may be one in 1, one in 0, and two in 1. The number of valid bitmap groups may be two, and thus, the fragmentation ratio FR may be 2.

Similarly, a second column of the valid page bitmap may include bits "1, 1, 1, and 1" and the number of sequential bits may be four in 1, and thus, the number of valid bitmap groups may be one and the fragmentation ratio FR may be 1.

Similarly, a third column of the valid page bitmap may include bits "1, 0, 0, and 1", and the number of sequential bits may be one in 1, two in 0, and one in 1. Here, the number of valid bitmap groups may be two, and the fragmentation ratio FR may be 2.

Similarly, a fourth column of the valid page bitmap may include bits "1, 0, 0, and 0", the number of sequential bits may be one in 1 and three in 0, and the number of valid bitmap groups may be one but may not have the same validity condition unlike the second column. Therefore, the fragmentation ratio FR may be 2.

Figure 13:
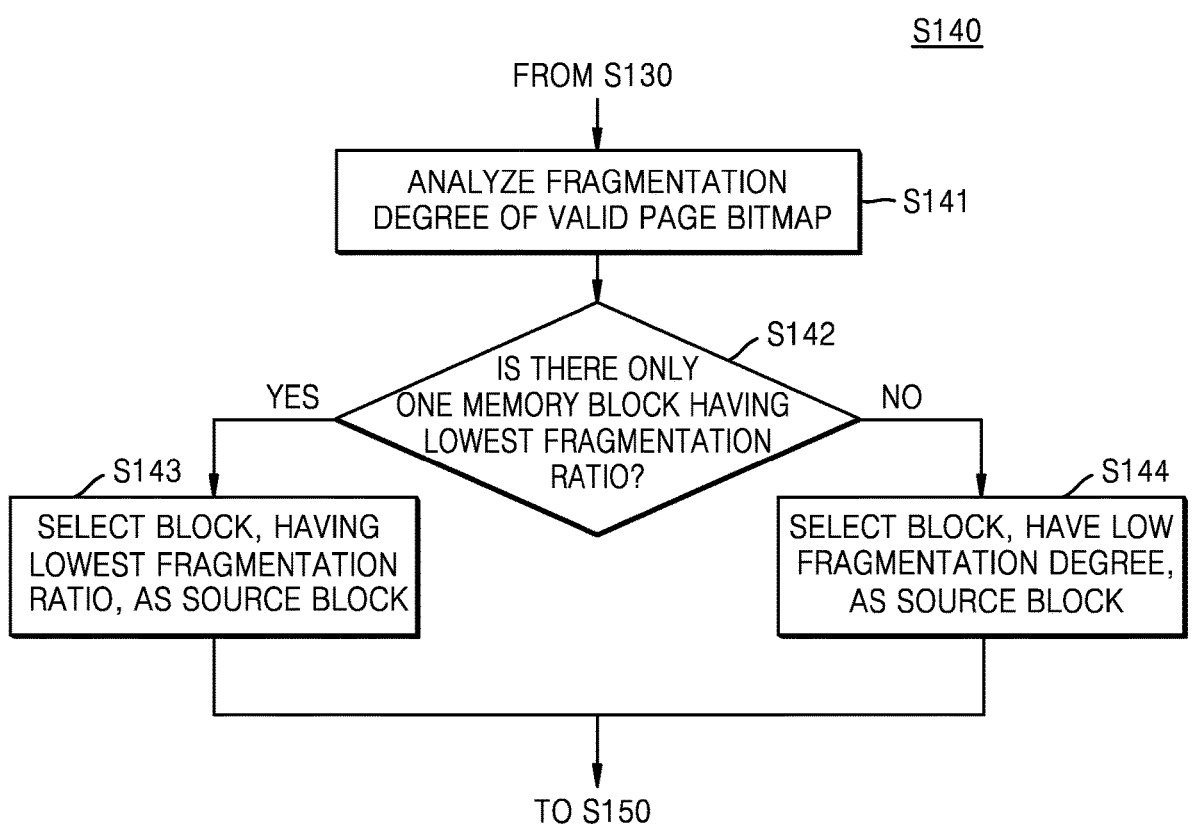
FIG. 13 is a flowchart describing an operating method of a memory controller, according to an embodiment.

FIG. 13 is a flowchart describing an operating method of a memory controller 100, according to an embodiment. FIG. 13 is a flowchart describing operation S140 of FIG. 6 in more detail. FIG. 13 is referred to in conjunction with FIG. 5.

In operation S141 after operation S130 is performed, the memory controller 100 may analyze a fragmentation ratio FR, which is a segmentation degree of a valid page bitmap.

In operation S142, the memory controller 100 may check whether any memory blocks have a minimum fragmentation ratio among a plurality of memory blocks (210 of FIG. 5) included in the memory device 200 and may check whether there is only one memory block having the minimum fragmentation ratio.

In operation S143, when there is only one memory block having the minimum fragmentation ratio, the memory controller 100 may select that memory block as the source block BLK_S 211. (This source block may be a first source block in a garbage collection procedure in which source blocks are determined in an ascending order of fragmentation ratios.)

In operation S144, when there is not only one memory block having the minimum fragmentation ratio, the memory controller 100 may select a memory block having a relatively low fragmentation degree (discussed below), as a source block (211 of FIG. 5). According to an embodiment, the fragmentation degree may correspond to the number of valid page groups and invalid page groups, which are adjacent to one another and have the same validity condition. For example, the fragmentation degree may be calculated from the number of groups having the same validity condition among sequential bits of one memory block in a valid page bitmap. A fragmentation degree will be described below with reference to FIG. 14.

Subsequently, operation S150 may be performed.

FIG. 14 is a conceptual diagram describing a fragmentation degree calculated in a memory controller 100, according to an embodiment.

According to an embodiment, a fragmentation degree FD may correspond to the number of valid page groups and invalid page groups, which are adjacent to one another and have the same validity condition. For example, the fragmentation degree FD may be calculated from the number of groups having the same validity condition among a plurality of page groups obtained by grouping sequential bits of one memory block in a valid page bitmap.

In the example of FIG. 14, a fragmentation degree FD of each of a first column, a third column, and a fourth column of the valid page bitmap is, respectively, 3, 3 and 2. As illustrated, the first column of the valid page bitmap may include a total of three page groups (for example, two valid page groups and one invalid page group), and thus, the fragmentation degree FD may be 3. Similarly, the third column of the valid page bitmap may include a total of three page groups (for example, two valid page groups and one invalid page group), and thus, the fragmentation degree FD may be 3. Similarly, the fourth column of the valid page bitmap may include a total of two page groups (for example, one valid page group and one invalid page group), and thus, the fragmentation degree FD may be 2.

Figure 15:
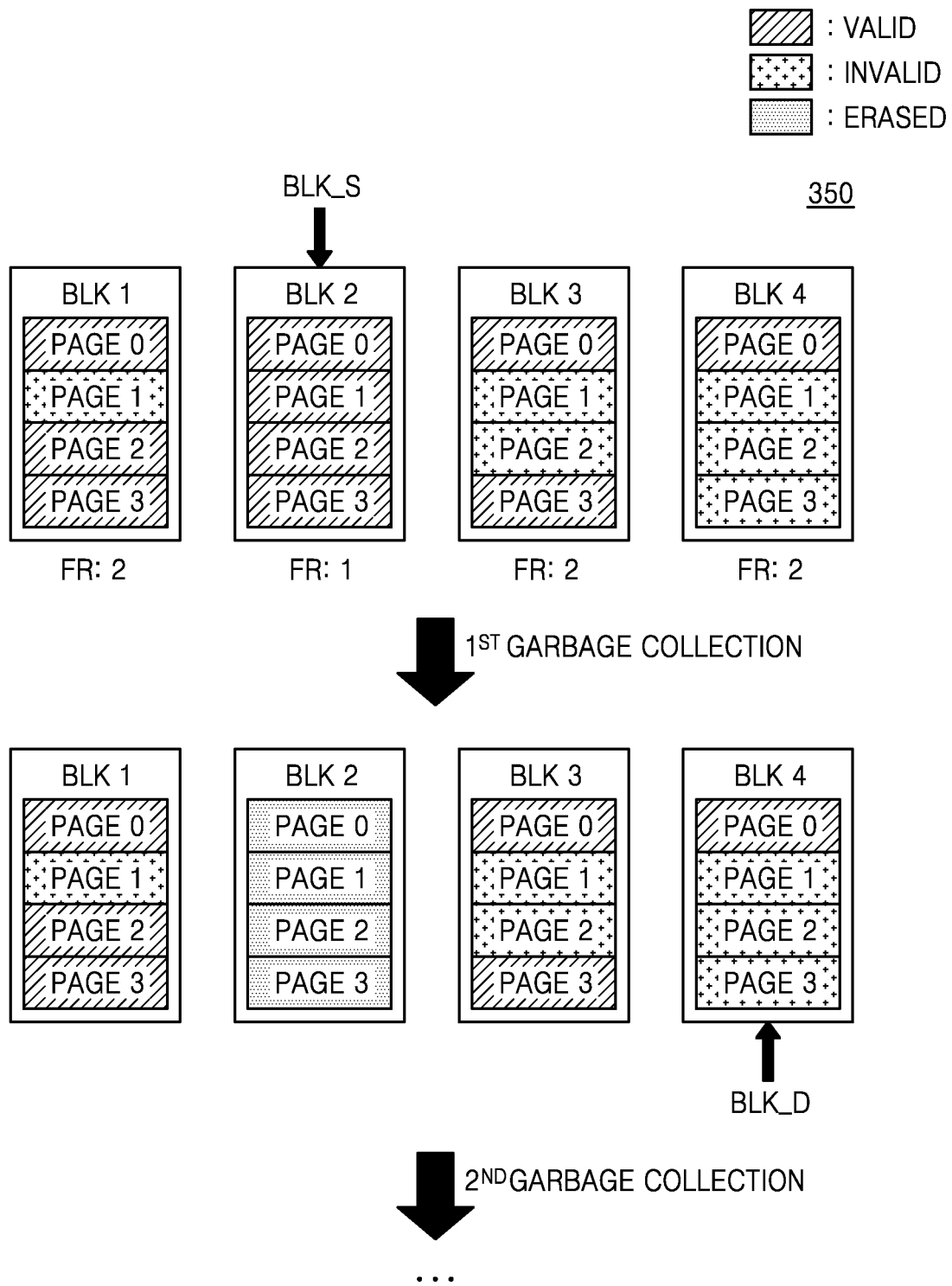
FIG. 15 is a conceptual diagram describing garbage collection performed by using a fragmentation ratio and a fragmentation degree, according to an embodiment.

FIG. 15 is a conceptual diagram describing garbage collection performed by using a fragmentation ratio FR and a fragmentation degree FD, according to an embodiment. FIG. 15 is referred to in conjunction with FIG. 5.

According to an embodiment, the GC manager 350 may select a second memory block BLK2, having a lowest fragmentation ratio FR, as a source block BLK_S (211 of FIG. 5). The second memory block BLK2 may perform first garbage collection on the source block BLK_S, and thus, the second memory block BLK2 may be erased.

Subsequently, second garbage collection may be needed. A first memory block BLK1, a third memory block BLK3, and a fourth memory block BLK4 may have the same fragmentation ratio FR (=2).

According to an embodiment, the fourth memory block BLK4 may be a fragmentation ratio FR of 2, and thus, may have a fragmentation degree FD which is relatively lower than that of the first memory block BLK1 or the third memory block BLK3 and may be selected as the source block BLK_S for the second garbage collection.

Figure 16:
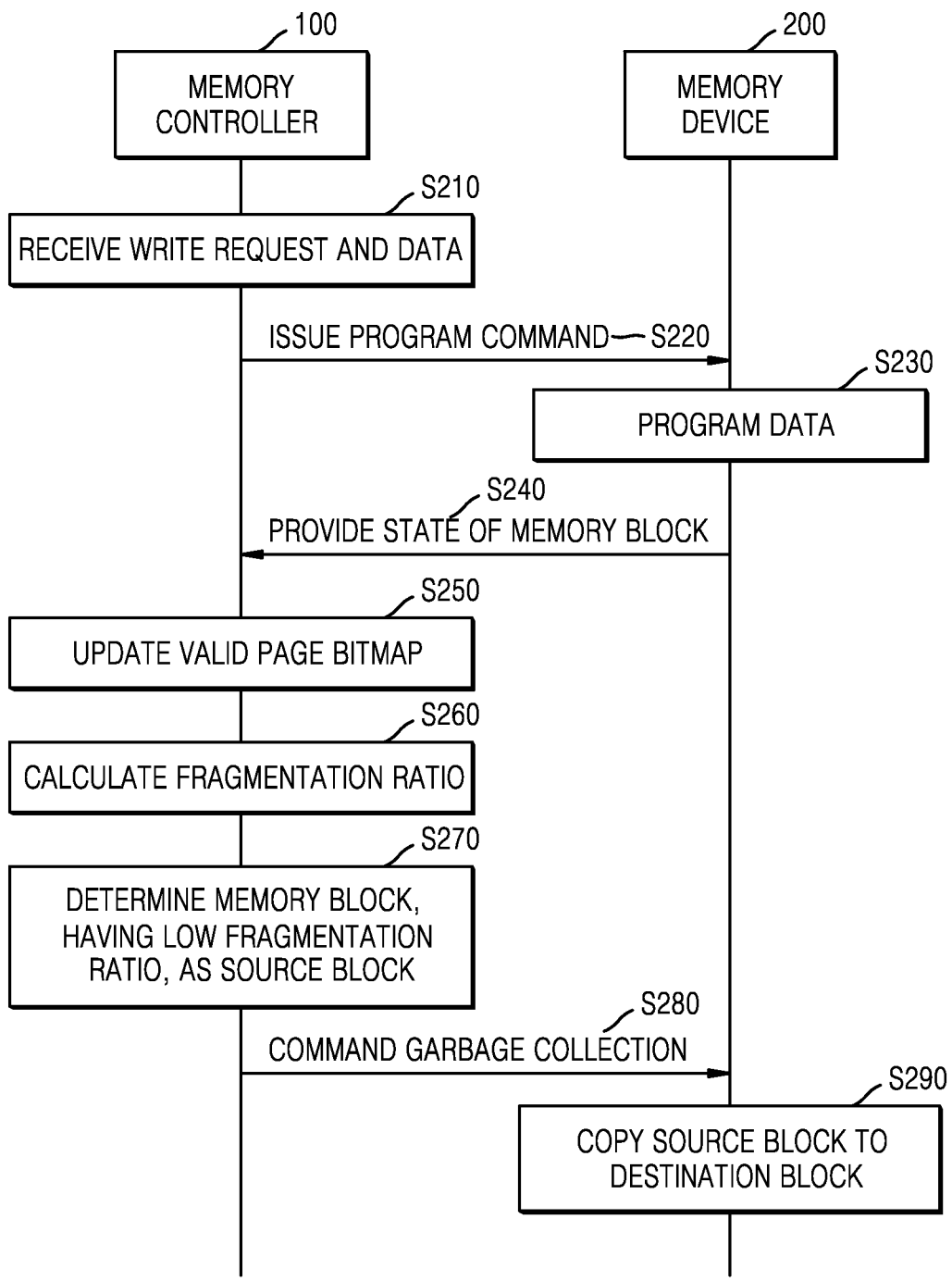
FIG. 16 is a flowchart describing an operating method of a storage device, according to an embodiment.

FIG. 16 is a flowchart describing an operating method of a storage device 10, according to an embodiment. FIG. 16 is referred to in conjunction with FIG. 5.

In operation S210, a memory controller 100 may receive a write request and data DATA, corresponding to the write request, from a host.

In operation S220, the memory controller 100 may issue a program command and may transfer the program command to the memory device 200.

In operation S230, a memory device 200 may write DATA in a free page of a memory block in response to the program command. According to an embodiment, the data DATA may be buffered by a page buffer (250 of FIG. 5) and may be provided.

In operation S240, the memory device 200 may provide a state of a memory block. According to an embodiment, the state of the memory block may include valid page information VI which is the validity of a page storing DATA.

In operation S250, the memory controller 100 may update a valid page bitmap. According to an embodiment, the memory controller 100 may receive validity information about a page where data is written and may update information about a changed page.

In operation S260, the memory controller 100 may calculate a fragmentation ratio FR on the basis of the valid page information VI. According to an embodiment, the fragmentation ratio FR may be calculated based on the bit continuity of the valid page bitmap and may correspond to a valid page group among a plurality of groups including bits which are adjacent to one another and have the same validity condition.

In operation S270, the memory controller 100 may determine a memory block, having a low fragmentation ratio FR, as a source block BLK_S (211 of FIG. 1). According to an embodiment, the memory controller 100 may align fragmentation ratios FR in ascending order of magnitudes and may select a memory block as the source block BLK_S 211 sequentially from a memory block having a low fragmentation ratio FR.

In operation S280, the memory controller 100 may command the memory device 200 to perform garbage collection.

According to an embodiment, the memory controller 100 may select a memory block, having a low fragmentation ratio FR, as the source block BLK_S 211 and may perform garbage collection on the source block BLK_S 211, thereby increasing I/O efficiency.

In operation S290, the memory device 200 may copy the source block BLK_S 211 to a destination block BLK_D to perform garbage collection. According to an embodiment, the memory device 200 may copy a valid page of the source block BLK_S 211 to a free page of the destination block BLK_D (213 of FIG. 5).

Figure 17:
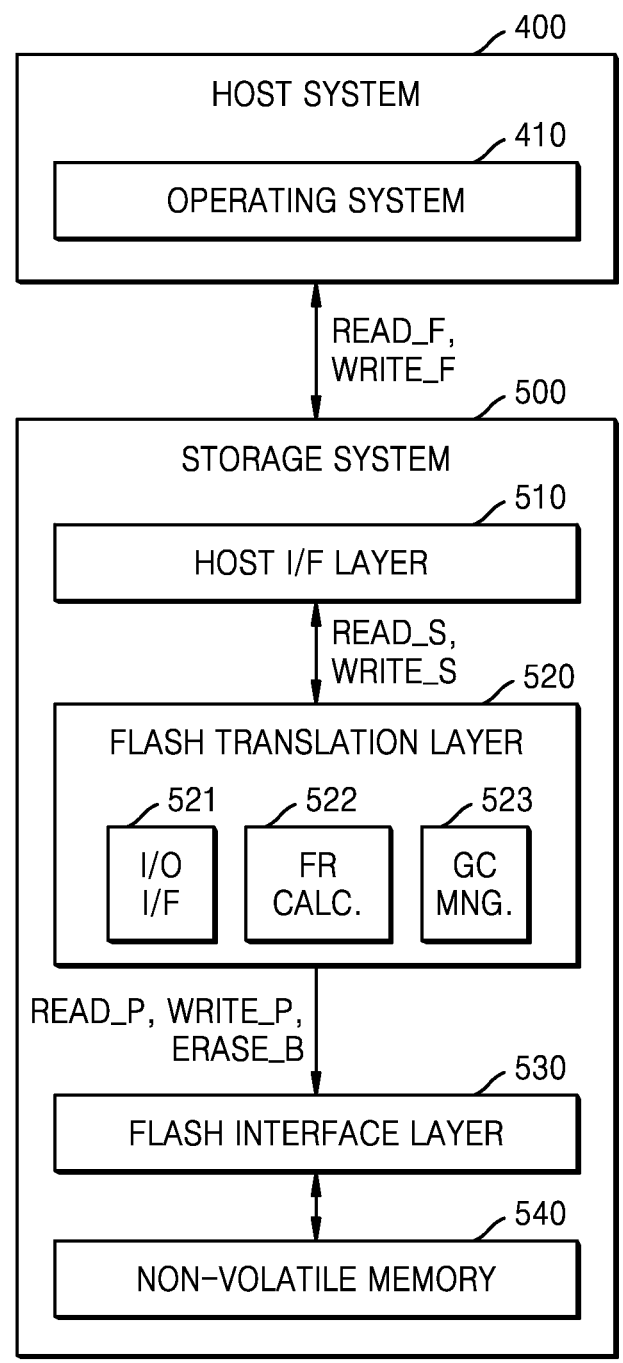
FIG. 17 is a block diagram illustrating a memory system according to an embodiment.

FIG. 17 is a block diagram illustrating a memory system 1 according to an embodiment. A storage system 500 illustrated in FIG. 17 may be functionally similar to the storage device 10 of FIG. 5, and thus, repetitive descriptions are omitted.

A host system 400 and the storage system 500 may configure the memory system 1. In an embodiment, the memory system 1 may configure a computer, an ultra mobile personal computer (PC) (UMPC), a workstation, a net-book computer, a personal digital assistant (PDA), a portable computer, a web tablet, a tablet computer, a wireless phone, a mobile phone, a smartphone, e-book, a portable multimedia player (PMP), a potable game machine, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data sector, a device for transmitting or receiving information in a wireless environment, one of various electronic devices configuring a home network, one of various electronic devices configuring a computer network, one of various electronic devices configuring a telematics network, a radio frequency identification (RFID) device, or one of various electronic devices configuring a computing system.

The host system 400 may include at least one operating system (OS) 410, and the OS 410 may overall manage and control a function and an operation of the host and may provide a mutual operation between the host and a user who uses the memory system 1.

Here, the OS 410 may support a function and an operation which correspond to the use purpose and usability of a user, and for example, may be classified into a general OS and a mobile OS on the basis of the mobility of the host device 200. The general OS in the OS 410 may be classified into a personal OS and an enterprise OS. For example, the personal OS may be a system which is specialized to support a service providing function for general users and may include Windows and Chrome, and the enterprise OS may be a system which is specialized to secure and support high performance and may include Windows server, Linux, and Unix.

The mobile OS in the OS 410 may be a system which is specialized to support a function of providing a mobile service to users and a power saving function of a system and may include android, iOS, and Windows mobile. In an embodiment, the host may include a plurality of OSs and may also execute an OS for performing an operation with the memory system 1 corresponding to a user request. Here, the host may transfer a plurality of commands, corresponding to a user request, to the memory system 1, and thus, the memory system 1 may perform operations (i.e., operations corresponding to a user request) corresponding to instructions.

A read request and a write request of the host system 400 may be performed by file units. That is, based on a file read request READ_F and a file write request WRITE_F, data may be stored in the storage system 500 by the host system 400, or the data stored in the storage system 500 may be read by the host system 400.

The storage system 500 may be implemented with, for example, a personal computer (PC), a data server, a network-attached storage (NAS), an Internet of things (IoT) device, or a portable electronic device. Examples of the portable electronic device may include laptop computer, mobile phones, smartphones, tablet PCs, personal digital assistant (PDA), enterprise digital assistant (EDA), digital still cameras, digital video cameras, audio devices, portable multimedia player (PMP), personal navigation device (PND), MP3 player, handheld game console, e-book, and wearable devices.

The storage system 500 may include a host interface layer 510, a flash translation layer 520, a flash interface layer 530, and a non-volatile memory 540.

The host interface layer 510 may be a logical area where interfacing between the host system 400 and the storage system 500 is performed.

The flash translation layer 520 may be understood as another type of the flash translation layer 300 of FIG. 5, an I/O interface 521 may provide the same function as that of the I/O interface 310 of FIG. 5, an FR calculator 522 may provide the same function as that of the FR calculator 330 of FIG. 5, and a GC manager 523 may provide the same function as that of the GC manager 350 of FIG. 5. Therefore, repetitive descriptions are omitted.

The host interface layer 510 and the flash translation layer 520 may write or read data by sector units. That is, based on a read/write request of a host system, the host interface layer 510 may request a read/write request READ_S/WRITE_S from the flash translation layer 520.

The flash interface layer 530 may provide interfacing between the flash translation layer 520 and the non-volatile memory 540. According to an embodiment, reading READ_P of data and writing WRITE_P of data may be performed by page units, but erasing ERASE_B of data may be performed by block units.

The non-volatile memory 540 may be understood as the memory device 200 of FIG. 5, and thus, repetitive descriptions are omitted.

The memory system 1 according to an embodiment may be mounted by using various types of packages. For example, the memory system 1 according to an embodiment may be mounted as a type such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), system in package (SIP), and multi-chip package.

Figure 18:
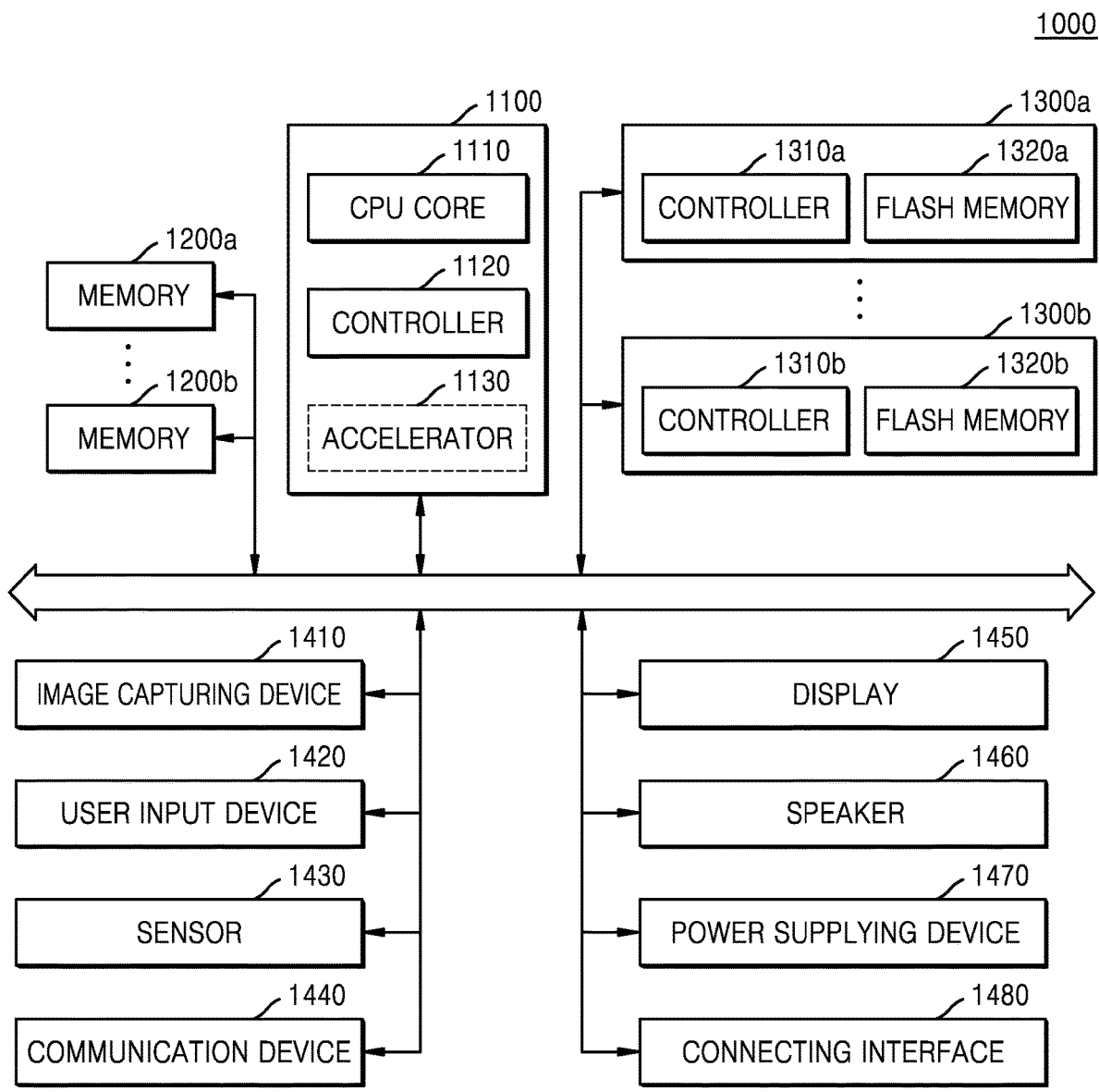
FIG. 18 is a block diagram illustrating a storage system to which a storage device according to an embodiment is applied.

FIG. 18 is a block diagram illustrating a storage system 1000 according to an embodiment.

FIG. 18 is a block diagram illustrating the storage system 1000 to which a storage device (for example, 10 of FIG. 5) according to an embodiment is applied. FIG. 18 is a diagram of a storage system 1000 to which a storage device is applied, according to an embodiment. The storage system 1000 of FIG. 18 may basically be a mobile system, such as a portable communication terminal (e.g., a mobile phone), a smartphone, a tablet personal computer (PC), a wearable device, a healthcare device, or an Internet of things (IOT) device. However, the storage system 1000 of FIG. 18 is not necessarily limited to the mobile system and may be a PC, a laptop computer, a server, a media player, or an automotive device (e.g., a navigation device).

Referring to FIG. 18, the storage system 1000 may include a main processor 1100, memories (e.g., 1200a and 1200b), and storage devices (e.g., 1300a and 1300b). In addition, the storage system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the storage system 1000, more specifically, operations of other components included in the storage system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the storage system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include V-NAND flash memories having a two-dimensional (2D) structure or a three-dimensional (3D) structure, the NVMs 1320a and 1320b may include other types of NVMs, such as PRAM and/or RRAM.

The storage devices 1300a and 1300b may be physically separated from the main processor 1100 and included in the storage system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or an NVM express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the storage system 1000 and include a touch pad, a keypad, a keyboard, a mouse, and a microphone.

The sensor 1430 may detect various types of physical quantities, which may be obtained from the outside of the storage system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the storage system 1000 according to various communication protocols. The communication device 1440 may include an antenna, a transceiver, or a modem.

The display 1450 and the speaker 1460 may serve as output devices configured to respectively output visual information and auditory information to the user of the storage system 1000.

The power supplying device 1470 may appropriately convert power supplied from a battery (not shown) embedded in the storage system 1000 and/or an external power source, and supply the converted power to each of components of the storage system 1000.

The connecting interface 1480 may provide connection between the storage system 1000 and an external device, which is connected to the storage system 1000 and capable of transmitting and receiving data to and from the storage system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 19:
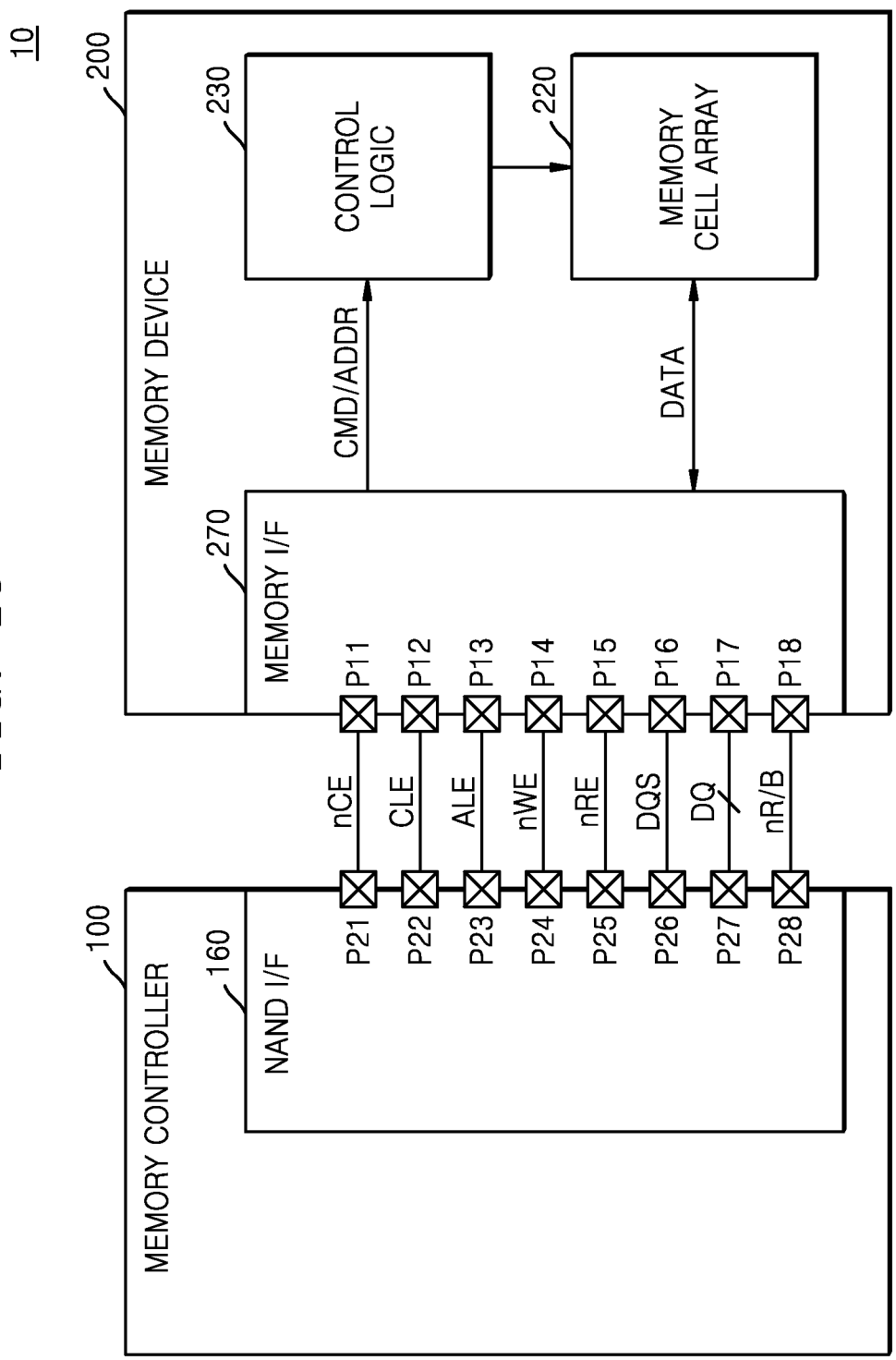
FIG. 19 is a block diagram illustrating a memory system according to an embodiment.

FIG. 19 is a block diagram illustrating a memory system 20 according to an embodiment.

FIG. 19 is a block diagram of a memory system 10 according to an embodiment. Referring to FIG. 19, the memory system 10 may include a memory device 200 and a memory controller 100. The memory device 200 may correspond to one of NVM devices NVM11 to NVMmn, which communicate with a memory controller 200 based on one of the plurality of channels CH1 to CHm of FIG. 3. The memory controller 100 may correspond to the memory controller 200 of FIG. 3.

The memory device 200 may include first to eighth pins P11 to P18, a memory interface circuitry 270, a control logic circuitry 230, and a memory cell array 220.

The memory interface circuitry 270 may receive a chip enable signal nCE from the memory controller 100 through the first pin P11. The memory interface circuitry 270 may transmit and receive signals to and from the memory controller 100 through the second to eighth pins P12 to P18 in response to the chip enable signal nCE. For example, when the chip enable signal nCE is in an enable state (e.g., a low level), the memory interface circuitry 270 may transmit and receive signals to and from the memory controller 100 through the second to eighth pins P12 to P18.

The memory interface circuitry 270 may receive a command latch enable signal CLE, an address latch enable signal ALE, and a write enable signal nWE from the memory controller 100 through the second to fourth pins P12 to P14.

The memory interface circuitry 270 may receive a data signal DQ from the memory controller 100 through the seventh pin P17 or transmit the data signal DQ to the memory controller 100. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 270 may obtain the command CMD from the data signal DQ, which is received in an enable section (e.g., a high-level state) of the command latch enable signal CLE based on toggle time points of the write enable signal nWE. The memory interface circuitry 270 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 270 may obtain the command CMD or the address ADDR based on toggle time points of the write enable signal nWE.

The memory interface circuitry 270 may receive a read enable signal nRE from the memory controller 100 through the fifth pin P15. The memory interface circuitry 270 may receive a data strobe signal DQS from the memory controller 100 through the sixth pin P16 or transmit the data strobe signal DQS to the memory controller 100.

In a data (DATA) output operation of the memory device 200, the memory interface circuitry 270 may receive the read enable signal nRE, which toggles through the fifth pin P15, before outputting the DATA. The memory interface circuitry 270 may generate the data strobe signal DQS, which toggles based on the toggling of the read enable signal nRE. For example, the memory interface circuitry 270 may generate a data strobe signal DQS, which starts toggling after a predetermined delay (e.g., tDQSRE), based on a toggling start time of the read enable signal nRE. The memory interface circuitry 270 may transmit the data signal DQ including the DATA based on a toggle time point of the data strobe signal DQS. Thus, the DATA may be aligned with the toggle time point of the data strobe signal DQS and transmitted to the memory controller 100.

In a DATA input operation of the memory device 200, when the data signal DQ including the DATA is received from the memory controller 100, the memory interface circuitry 270 may receive the data strobe signal DQS, which toggles, along with the DATA from the memory controller 100. The memory interface circuitry 270 may obtain the DATA from the data signal DQ based on toggle time points of the data strobe signal DQS. For example, the memory interface circuitry 270 may sample the data signal DQ at rising and falling edges of the data strobe signal DQS and obtain the DATA.

The memory interface circuitry 270 may transmit a ready/busy output signal nR/B to the memory controller 100 through the eighth pin P18. The memory interface circuitry 270 may transmit state information of the memory device 200 through the ready/busy output signal nR/B to the memory controller 100. When the memory device 200 is in a busy state (i.e., when operations are being performed in the memory device 200), the memory interface circuitry 270 may transmit a ready/busy output signal nR/B indicating the busy state to the memory controller 100. When the memory device 200 is in a ready state (i.e., when operations are not performed or completed in the memory device 200), the memory interface circuitry 270 may transmit a ready/busy output signal nR/B indicating the ready state to the memory controller 100. For example, while the memory device 200 is reading DATA from the memory cell array 220 in response to a page read command, the memory interface circuitry 270 may transmit a ready/busy output signal nR/B indicating a busy state (e.g., a low level) to the memory controller 100. For example, while the memory device 200 is programming DATA to the memory cell array 220 in response to a program command, the memory interface circuitry 270 may transmit a ready/busy output signal nR/B indicating the busy state to the memory controller 100.

The control logic circuitry 230 may control all operations of the memory device 200. The control logic circuitry 230 may receive the command/address CMD/ADDR obtained from the memory interface circuitry 270. The control logic circuitry 230 may generate control signals for controlling other components of the memory device 200 in response to the received command/address CMD/ADDR. For example, the control logic circuitry 230 may generate various control signals for programming DATA to the memory cell array 220 or reading the DATA from the memory cell array 220.

The memory cell array 220 may store the DATA obtained from the memory interface circuitry 270, via the control of the control logic circuitry 230. The memory cell array 220 may output the stored DATA to the memory interface circuitry 270 via the control of the control logic circuitry 230.

The memory cell array 220 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 100 may include first to eighth pins P21 to P28 and a NAND interface circuitry 160. The first to eighth pins P21 to P28 may respectively correspond to the first to eighth pins P11 to P18 of the memory device 200.

The NAND interface circuitry 160 may transmit a chip enable signal nCE to the memory device 200 through the first pin P21. The NAND interface circuitry 160 may transmit and receive signals to and from the memory device 200, which is selected by the chip enable signal nCE, through the second to eighth pins P22 to P28.

The NAND interface circuitry 160 may transmit the command latch enable signal CLE, the address latch enable signal ALE, and the write enable signal nWE to the memory device 200 through the second to fourth pins P22 to P24. The NAND interface circuitry 160 may transmit or receive the data signal DQ to and from the memory device 200 through the seventh pin P27.

The NAND interface circuitry 160 may transmit the data signal DQ including the command CMD or the address ADDR to the memory device 200 along with the write enable signal nWE, which toggles. The NAND interface circuitry 160 may transmit the data signal DQ including the command CMD to the memory device 200 by transmitting a command latch enable signal CLE having an enable state. Also, the NAND interface circuitry 160 may transmit the data signal DQ including the address ADDR to the memory device 200 by transmitting an address latch enable signal ALE having an enable state.

The NAND interface circuitry 160 may transmit the read enable signal nRE to the memory device 200 through the fifth pin P25. The NAND interface circuitry 160 may receive or transmit the data strobe signal DQS from or to the memory device 200 through the sixth pin P26.

In a DATA output operation of the memory device 200, the NAND interface circuitry 160 may generate a read enable signal nRE, which toggles, and transmit the read enable signal nRE to the memory device 200. For example, before outputting DATA, the NAND interface circuitry 160 may generate a read enable signal nRE, which is changed from a static state (e.g., a high level or a low level) to a toggling state. Thus, the memory device 200 may generate a data strobe signal DQS, which toggles, based on the read enable signal nRE. The NAND interface circuitry 160 may receive the data signal DQ including the DATA along with the data strobe signal DQS, which toggles, from the memory device 200. The NAND interface circuitry 160 may obtain the data DATA from the data signal DQ based on a toggle time point of the data strobe signal DQS.

In a data (DATA) input operation of the memory device 200, the NAND interface circuitry 160 may generate a data strobe signal DQS, which toggles. For example, before transmitting data DATA, the NAND interface circuitry 160 may generate a data strobe signal DQS, which is changed from a static state (e.g., a high level or a low level) to a toggling state. The NAND interface circuitry 160 may transmit the data signal DQ including the data DATA to the memory device 200 based on toggle time points of the data strobe signal DQS.

The NAND interface circuitry 160 may receive a ready/busy output signal nR/B from the memory device 200 through the eighth pin P28. The NAND interface circuitry 160 may determine state information of the memory device 200 based on the ready/busy output signal nR/B.

Figure 20:
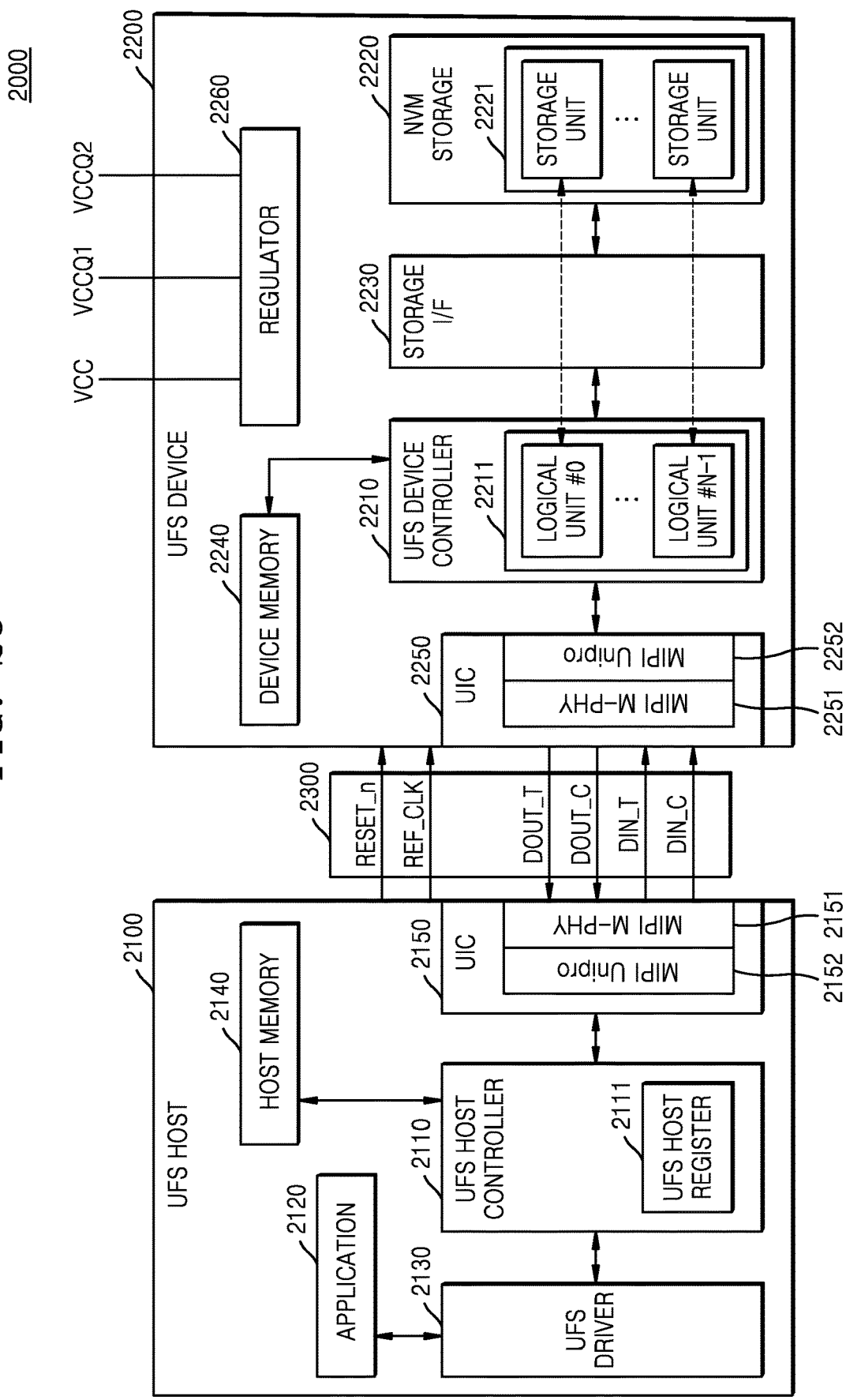
FIG. 20 is a block diagram describing a universal flash storage (UFS) system according to an embodiment.

FIG. 20 is a block diagram describing a universal flash storage (UFS) system 2000 according to an embodiment.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 20 within a range that does not conflict with the following description of FIG. 20.

Referring to FIG. 20, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 1. The UFS device 2200 may correspond to the storage device 1300a and 1300b of FIG. 1, and a UFS device controller 2210 and an NVM 2220 may respectively correspond to the storage controllers 1310a and 1310b and the NVMs 1320a and 1320b of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 20, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 20, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 21:
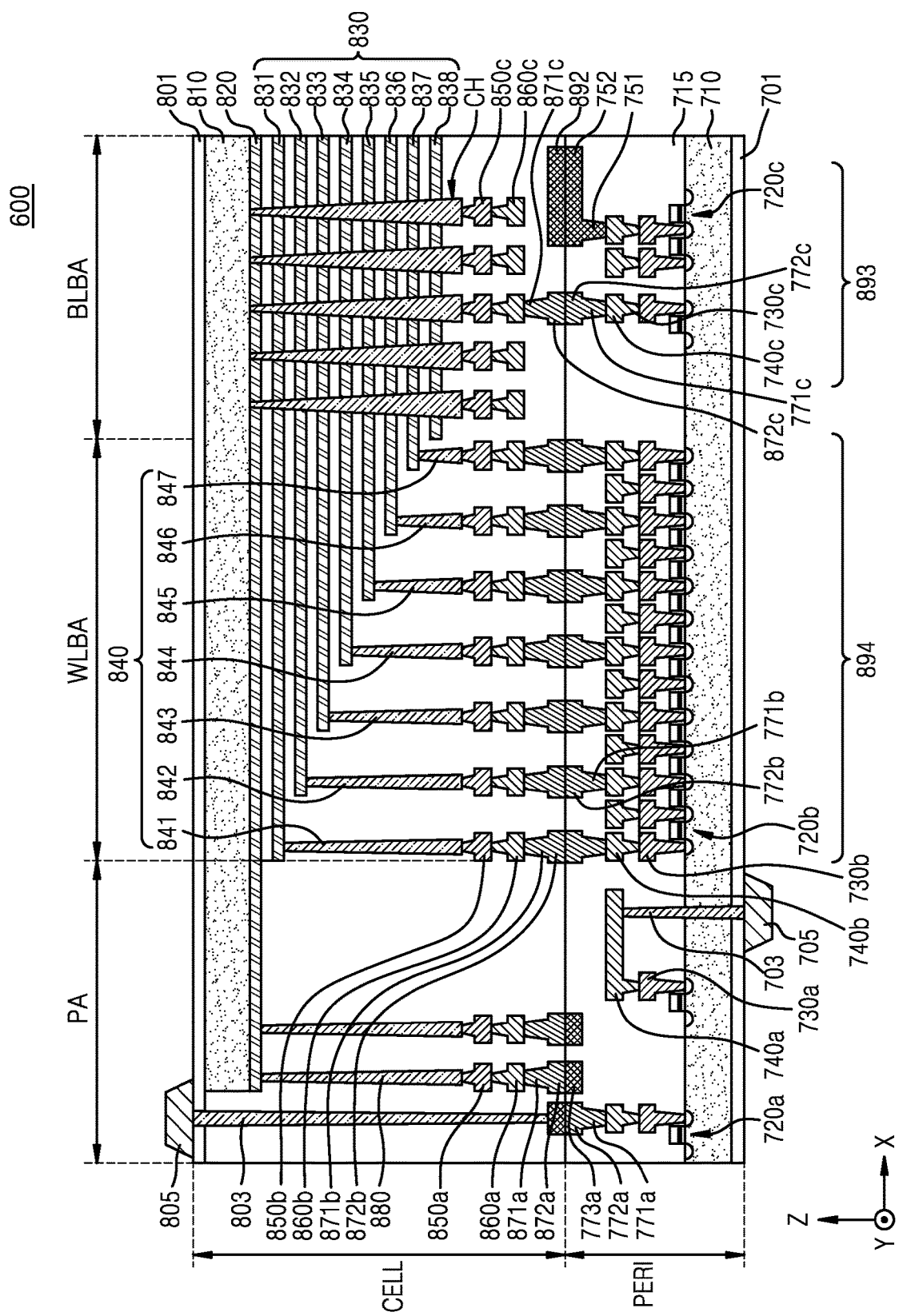
FIG. 21 is a cross-sectional view of a structure of a memory device applicable to a storage device according to an embodiment.

FIG. 21 is a cross-sectional view of a structure of a memory device applicable to a storage device 10 according to an embodiment.

Referring to FIG. 21, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. Other implementations are also possible. For example, the bonding metals may also be formed of aluminum (Al) or tungsten (W).

Each of the peripheral circuit region PERI and the cell region CELL of the memory device 600 may include an external pad bonding area PA, a word line bonding area WLBA, and a bit line bonding area BLBA.

The peripheral circuit region PERI may include a first substrate 710, an interlayer insulating layer 715, a plurality of circuit elements 720*a*, 720*b*, and 720*c* formed on the first substrate 710, first metal layers 730*a*, 730*b*, and 730*c* respectively connected to the plurality of circuit elements 720*a*, 720*b*, and 720*c*, and second metal layers 740*a*, 740*b*, and 740*c* formed on the first metal layers 730*a*, 730*b*, and 730*c*. In an example embodiment, the first metal layers 730*a*, 730*b*, and 730*c* may be formed of tungsten having relatively high electrical resistivity, and the second metal layers 740*a*, 740*b*, and 740*c* may be formed of copper having relatively low electrical resistivity.

In an example embodiment illustrate in FIG. 21, although only the first metal layers 730*a*, 730*b*, and 730*c* and the second metal layers 740*a*, 740*b*, and 740*c* are shown and described, the example embodiment is not limited thereto, and one or more additional metal layers may be further formed on the second metal layers 740*a*, 740*b*, and 740*c*. At least a portion of the one or more additional metal layers formed on the second metal layers 740*a*, 740*b*, and 740*c* may be formed of aluminum or the like having a lower electrical resistivity than those of copper forming the second metal layers 740*a*, 740*b*, and 740*c*.

The interlayer insulating layer 715 may be disposed on the first substrate 710 and cover the plurality of circuit elements 720*a*, 720*b*, and 720*c*, the first metal layers 730*a*, 730*b*, and 730*c*, and the second metal layers 740*a*, 740*b*, and 740*c*. The interlayer insulating layer 715 may include an insulating material such as silicon oxide, silicon nitride, or the like.

Lower bonding metals 771*b* and 772*b* may be formed on the second metal layer 740*b* in the word line bonding area WLBA. In the word line bonding area WLBA, the lower bonding metals 771*b* and 772*b* in the peripheral circuit region PERI may be electrically bonded to upper bonding metals 871*b* and 872*b* of the cell region CELL. The lower bonding metals 771*b* and 772*b* and the upper bonding metals 871*b* and 872*b* may be formed of aluminum, copper, tungsten, or the like. Further, the upper bonding metals 871*b* and 872*b* in the cell region CELL may be referred as first metal pads and the lower bonding metals 771*b* and 772*b* in the peripheral circuit region PERI may be referred as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (a Z-axis direction), perpendicular to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (a Z-axis direction), perpendicular to the upper surface of the second substrate 810, and pass through the plurality of word lines 830, the at least one string select line, and the at least one ground select line. The channel structure CH may include a data storage layer, a channel layer, a buried insulating layer, and the like, and the channel layer may be electrically connected to a first metal layer 850c and a second metal layer 860c. For example, the first metal layer 850c may be a bit line contact, and the second metal layer 860c may be a bit line. In an example embodiment, the bit line 860c may extend in a first direction (a Y-axis direction), parallel to the upper surface of the second substrate 810.

In an example embodiment illustrated in FIG. 21, an area in which the channel structure CH, the bit line 860c, and the like are disposed may be defined as the bit line bonding area BLBA. In the bit line bonding area BLBA, the bit line 860c may be electrically connected to the circuit elements 720c providing a page buffer 893 in the peripheral circuit region PERI. The bit line 860c may be connected to upper bonding metals 871c and 872c in the cell region CELL, and the upper bonding metals 871c and 872c may be connected to lower bonding metals 771c and 772c connected to the circuit elements 720c of the page buffer 893. In an example embodiment, a program operation may be executed based on a page unit as write data of the page-unit is stored in the page buffer 893, and a read operation may be executed based on a sub-page unit as read data of the sub-page unit is stored in the page buffer 893. Also, in the program operation and the read operation, units of data transmitted through bit lines may be different from each other.

In the word line bonding area WLBA, the plurality of word lines 830 may extend in a second direction (an X-axis direction), parallel to the upper surface of the second substrate 810 and perpendicular to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850b and a second metal layer 860b may be connected to an upper portion of the plurality of cell contact plugs 840 connected to the plurality of word lines 830, sequentially. The plurality of cell contact plugs 840 may be connected to the peripheral circuit region PERI by the upper bonding metals 871b and 872b of the cell region CELL and the lower bonding metals 771b and 772b of the peripheral circuit region PERI in the word line bonding area WLBA.

The plurality of cell contact plugs 840 may be electrically connected to the circuit elements 720b forming a row decoder 894 in the peripheral circuit region PERI. In an example embodiment, operating voltages of the circuit elements 720b of the row decoder 894 may be different than operating voltages of the circuit elements 720c forming the page buffer 893. For example, operating voltages of the circuit elements 720c forming the page buffer 893 may be greater than operating voltages of the circuit elements 720b forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850a and a second metal layer 860a may be stacked on an upper portion of the common source line contact plug 880, sequentially. For example, an area in which the common source line contact plug 880, the first metal layer 850a, and the second metal layer 860a are disposed may be defined as the external pad bonding area PA.

Input-output pads 705 and 805 may be disposed in the external pad bonding area PA. Referring to FIG. 21, a lower insulating film 701 covering a lower surface of the first substrate 710 may be formed below the first substrate 710, and a first input-output pad 705 may be formed on the lower insulating film 701. The first input-output pad 705 may be connected to at least one of the plurality of circuit elements 720a, 720b, and 720c disposed in the peripheral circuit region PERI through a first input-output contact plug 703, and may be separated from the first substrate 710 by the lower insulating film 701. In addition, a side insulating film may be disposed between the first input-output contact plug 703 and the first substrate 710 to electrically separate the first input-output contact plug 703 and the first substrate 710.

Referring to FIG. 21, an upper insulating film 801 covering the upper surface of the second substrate 810 may be formed on the second substrate 810, and a second input-output pad 805 may be disposed on the upper insulating layer 801. The second input-output pad 805 may be connected to at least one of the plurality of circuit elements 720a, 720b, and 720c disposed in the peripheral circuit region PERI through a second input-output contact plug 803. In the example embodiment, the second input-output pad 805 is electrically connected to a circuit element 720a.

According to embodiments, the second substrate 810 and the common source line 820 may not be disposed in an area in which the second input-output contact plug 803 is disposed. Also, the second input-output pad 805 may not overlap the word lines 830 in the third direction (the Z-axis direction). Referring to FIG. 21, the second input-output contact plug 303 may be separated from the second substrate 810 in a direction, parallel to the upper surface of the second substrate 810, and may pass through the interlayer insulating layer 815 of the cell region CELL to be connected to the second input-output pad 805.

According to embodiments, the first input-output pad 705 and the second input-output pad 805 may be selectively formed. For example, the memory device 600 may include only the first input-output pad 705 disposed on the first substrate 710 or the second input-output pad 805 disposed on the second substrate 810. Alternatively, the memory device 600 may include both the first input-output pad 705 and the second input-output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872a of the cell region CELL so as to be connected to each other, in an uppermost metal layer of the peripheral circuit region PERI. In the peripheral circuit region PERI, the lower metal pattern 773a formed in the uppermost metal layer of the peripheral circuit region PERI may not be connected to a contact. Similarly, in the external pad bonding area PA, an upper metal pattern 872a, corresponding to the lower metal pattern 773a formed in an uppermost metal layer of the peripheral circuit region PERI, and having the same shape as a lower metal pattern 773a of the peripheral circuit region PERI, may be formed in an uppermost metal layer of the cell region CELL.

The lower bonding metals 771b and 772b may be formed on the second metal layer 740b in the word line bonding area WLBA. In the word line bonding area WLBA, the lower bonding metals 771b and 772b of the peripheral circuit region PERI may be electrically connected to the upper bonding metals 871b and 872b of the cell region CELL by a Cu-to-Cu bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

Figure 22:
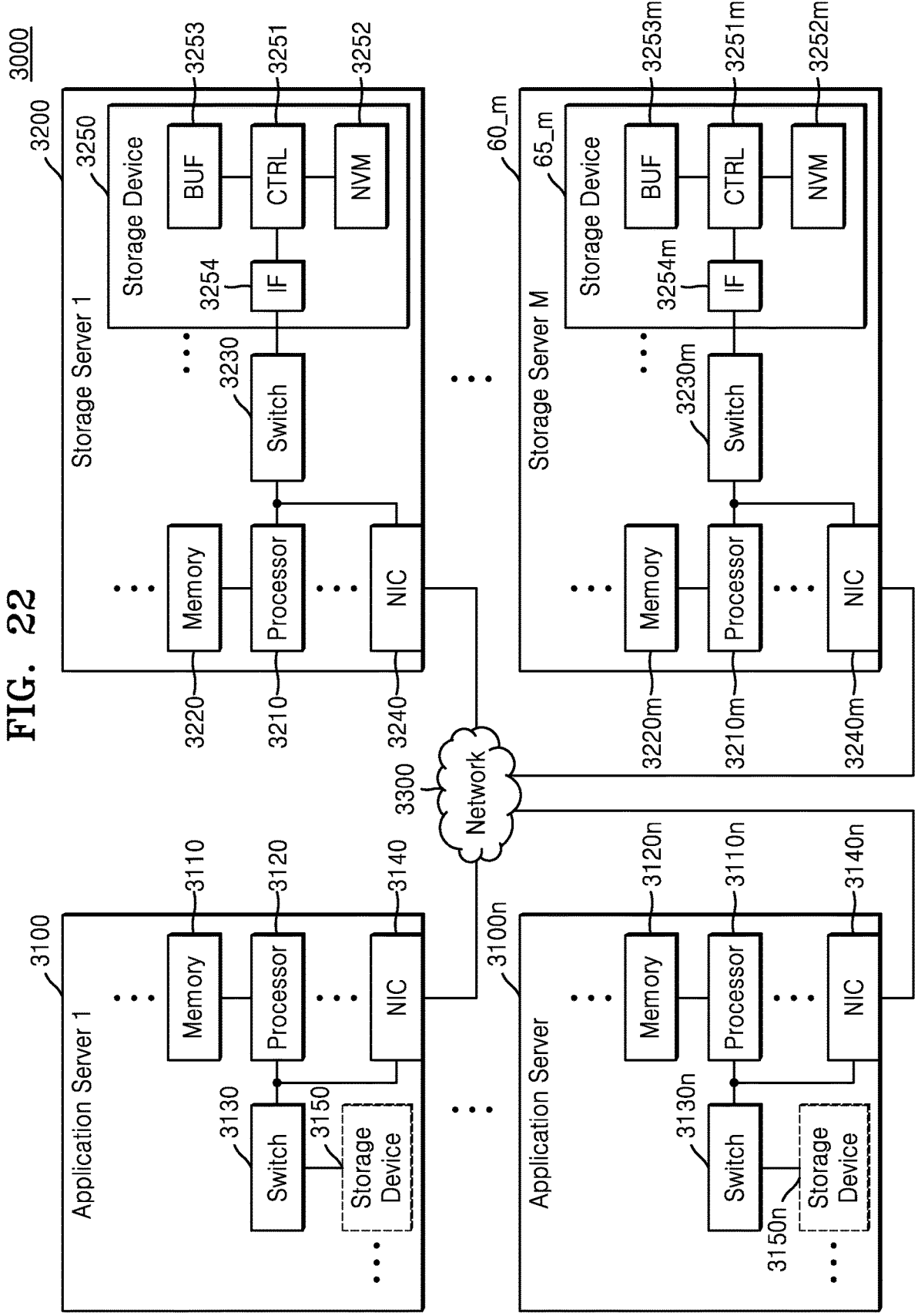
FIG. 22 is a block diagram illustrating a data sector to which a storage device according to an embodiment is applied.

FIG. 22 is a block diagram illustrating a data sector 3000 to which a storage device 10 according to an embodiment is applied.

Referring to FIG. 22, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

While the inventive concept has been particularly shown and described with reference to embodiments thereof, it will be understood that various changes in form and details may be made therein without departing from the spirit and scope of the following claims and their equivalents.

The invention claimed is:

1. An operating method of a memory controller configured to control a memory device including memory blocks, each for storing a plurality of pages, the operating method comprising:
   transferring a program command to the memory device based on a write request from a host;
   updating a valid page bitmap representing validity of a plurality of pages of the memory blocks based on valid page information;
   calculating, based on the valid page bitmap, fragmentation ratios, each representing a segmentation degree between at least one valid page and at least one invalid page of a memory block among the memory blocks;
   determining, in ascending order of the fragmentation ratios, source blocks among the memory blocks; and
   performing garbage collection on the source blocks.

2. The operating method of claim 1, wherein the calculating of the fragmentation ratios comprises grouping a plurality of pages which are adjacent to one another and have the same validity condition.

3. The operating method of claim 2, wherein each of the fragmentation ratios is calculated based on a number of valid page groups among the grouped pages of the valid page bitmap.

4. The operating method of claim 1, wherein, in the valid page bitmap, a valid page of the plurality of pages is expressed as a bit "1", and an invalid page of the plurality of pages is expressed as a bit "0", or vice versa.

5. The operating method of claim 1, wherein, the determining of the source blocks comprises:
   responsive to determining that a given memory block among a set of the memory blocks is the only memory block that has a minimum fragmentation ratio, selecting the given memory block as a first source block of the source blocks.

6. The operating method of claim 1, wherein, the determining of the source blocks comprises:
   checking whether there is only one memory block, among a set of memory blocks, that has a minimum fragmentation ratio; and
   responsive to determining that there is not only one memory block having the minimum fragmentation ratio, selecting a memory block, which is low in fragmentation degree calculated based on a bit continuity of one memory block of the valid page bitmap, as a first source block of the source blocks.

7. The operating method of claim 6, wherein, the fragmentation degree corresponds to a number of invalid page groups and valid page groups, which are adjacent to one another and have a same validity condition.

8. The operating method of claim 1, wherein, the updating of the valid page bitmap comprises:
   receiving the valid page information representing whether a page corresponding to a memory space with data written therein is valid; and
   updating the valid page information in the valid page bitmap.

9. An operating method of a storage device including a memory device including memory blocks each for storing a plurality of pages, and a memory controller configured to control the memory device, the operating method comprises:
   executing, by the memory controller, operations comprising:
      receiving data and a write request from a host;
      transferring a program command to the memory device;

writing, through use of the memory device, the data in a memory space and generating valid page information representing whether a page corresponding to the memory space with the data written therein is valid; and further executing, by the memory controller, operations comprising: updating a valid page bitmap representing validity of the plurality of pages based on valid page information; calculating, based on the valid page bitmap, a fragmentation ratio representing a segmentation degree between at least one valid page and at least one invalid page of a memory block among the memory blocks; and performing garbage collection based on the fragmentation ratio.

10. The operating method of claim 9, wherein the calculating of the fragmentation ratio comprises grouping a plurality of pages which are adjacent to one another and have a same validity condition.

11. The operating method of claim 9, wherein the fragmentation ratio is calculated based on a number of valid page groups among the grouped pages of the valid page bitmap.

12. The operating method of claim 9, wherein the performing of the garbage collection comprises:
calculating fragmentation ratios, each representing a segmentation degree between at least one valid page and at least one invalid page of a respective memory block among the memory blocks;
aligning the fragmentation ratios in ascending order of magnitudes; and
determining a source block in ascending order of the fragmentation ratios.

13. The operating method of claim 9, wherein the performing of the garbage collection comprises:
setting a memory block, having a lowest fragmentation ratio, as a source block;
copying data, stored in the source block, to a destination block; and
erasing the source block.

14. The operating method of claim 9, wherein the performing of the garbage collection comprises:
detecting a given memory block having a lowest fragmentation ratio; and
checking whether the given memory block having the lowest fragmentation ratio is the only memory block that has the lowest fragmentation ratio, among a set of the memory blocks.

15. The operating method of claim 14, further comprising selecting the given memory block, having the lowest fragmentation ratio, as a source block responsive to determining that the given memory block is the only memory block among the set of the memory blocks that has the lowest fragmentation ratio.

16. The operating method of claim 14, further comprising, responsive to determining that there is not only one memory block having the minimum fragmentation ratio, selecting a memory block, which is low in fragmentation degree calculated based on a bit continuity of one memory block of the valid page bitmap, as a source block.

17. The operating method of claim 16, wherein the fragmentation degree corresponds to a number of invalid page groups and valid page groups, which are adjacent to one another and have a same validity condition.

18. The operating method of claim 17, wherein the valid page group is a set of pages where validity of a page is expressed as "1" and which are adjacent to one another, and
the invalid page group is a set of pages where validity of a page is expressed as "0" and which are adjacent to one another.

19. A storage device comprising:
a memory device including a plurality of memory blocks each for storing multiple pages; and
a memory controller configured to calculate, based on valid page information about the plurality of memory blocks, a fragmentation ratio representing a segmentation degree between at least one valid page and at least one invalid page of a memory block of the plurality of memory blocks, and to rearrange and erase data, as part of a garbage collection process, within the plurality of memory blocks based on the fragmentation ratio.

20. The storage device of claim 19, wherein the memory controller is configured to: when the fragmentation ratio is the same as at least one other fragmentation ratio of a set of the memory blocks, perform the garbage collection based on a number of valid page groups and invalid page groups among a plurality of pages which are adjacent to one another and have a same validity condition.

* * * * *